(12) United States Patent
Zhang et al.

(10) Patent No.: US 11,463,850 B2
(45) Date of Patent: Oct. 4, 2022

(54) UPPER LAYERS REALIZATION OF UNICAST FOR C-V2X

(71) Applicant: QUALCOMM incorporated, San Diego, CA (US)

(72) Inventors: Juan Zhang, San Diego, CA (US); Ajith Tom Payyappilly, San Diego, CA (US); Tom Chin, San Diego, CA (US); Huayan Rong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/887,384

(22) Filed: May 29, 2020

(65) Prior Publication Data
US 2021/0377705 A1    Dec. 2, 2021

(51) Int. Cl.
| | | |
|---|---|---|
| *H04W 80/02* | (2009.01) | |
| *H04W 4/40* | (2018.01) | |
| *H04W 72/12* | (2009.01) | |
| *H04W 80/06* | (2009.01) | |

(Continued)

(52) U.S. Cl.
CPC ......... *H04W 4/40* (2018.02); *H04W 72/1257* (2013.01); *H04W 80/02* (2013.01); *H04W 80/06* (2013.01); *H04W 80/08* (2013.01); *H04W 92/18* (2013.01)

(58) Field of Classification Search
CPC ... H04W 4/40; H04W 80/02; H04W 72/1257; H04W 80/06; H04W 80/08; H04W 92/18
See application file for complete search history.

(56) References Cited

U.S. PATENT DOCUMENTS

| | | | |
|---|---|---|---|
| 2015/0029987 A1* | 1/2015 | Addepalli | H04W 40/20 370/329 |
| 2018/0083867 A1 | 3/2018 | Gotou | |
| 2018/0279175 A1* | 9/2018 | Gholmieh | H04L 47/6215 |

(Continued)

FOREIGN PATENT DOCUMENTS

| | | | |
|---|---|---|---|
| CN | 110149611 A | 8/2019 | |
| WO | 2020068430 A1 | 4/2020 | |
| WO | WO-2020068430 A1 * | 4/2020 | ......... H04L 61/2007 |

OTHER PUBLICATIONS

International Search Report and Written Opinion—PCT/US2021/027034—ISA/EPO—dated Jun. 28, 2021 15 pages.

*Primary Examiner* — Lakeram Jangbahadur
(74) *Attorney, Agent, or Firm* — The Marbury Law Group, PLLC

(57) ABSTRACT

Various embodiments provide methods, vehicle computing devices, storage media, and systems for unicast transmission of cellular vehicle-to-everything (C-V2X) Internet Protocol (IP) packets. Various embodiments may enable upper layers in a stack architecture to realize unicast transmission of C-V2X IP packets. In various embodiments, source port and destination IP address pairings may be associated with destination layer 2 (L2) addresses. In various embodiments, a source port indication and destination IP address indication may be added to a unicast C-V2X IP packet, such as a transmission control protocol (TCP) packet, a user datagram protocol (UDP) packet, etc., and the source port and destination IP address indications may be used by a modem to determine the destination L2 address for the unicast C-V2X IP packet.

12 Claims, 15 Drawing Sheets

(51) Int. Cl.
    *H04W 80/08* (2009.01)
    *H04W 92/18* (2009.01)

(56) References Cited

U.S. PATENT DOCUMENTS

| | | | |
|---|---|---|---|
| 2019/0289459 A1* | 9/2019 | Shan | H04M 15/00 |
| 2019/0364492 A1* | 11/2019 | Azizi | H04W 68/005 |
| 2020/0107169 A1* | 4/2020 | Chin | H04L 61/2038 |
| 2020/0229206 A1* | 7/2020 | Badic | H04W 4/023 |
| 2020/0336258 A1* | 10/2020 | Zhu | H04L 1/0076 |
| 2021/0021376 A1* | 1/2021 | Srivastava | H04W 4/40 |
| 2021/0022103 A1* | 1/2021 | Srivastava | H04W 64/003 |

* cited by examiner

UPPER LAYERS REALIZATION OF UNICAST FOR C-V2X

BACKGROUND

Cellular and wireless communication technologies have seen explosive growth over the past several years and are being used to support communications between a host of different types of communication devices, such as smartphones, vehicle-based communication devices, infrastructure communication devices, network communication devices, etc. This growth has been fueled by better communications hardware, larger networks, and more reliable protocols.

The surface transportation industry has increasingly looked to leverage the growing capabilities of cellular and wireless communication technologies through the adoption of Intelligent Transportation Systems (ITS) technologies to increase intercommunication and Safety for both driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them. C-V2X communication technologies hold promise for improving vehicle safety, managing traffic congestion and support autonomous and semi-autonomous vehicles.

SUMMARY

Various aspects include methods for providing and receiving unicast transmission of cellular vehicle-to-everything (C-V2X) Internet Protocol (IP) packets. Various aspects may enable upper layers in a stack architecture to realize unicast transmission and reception of C-V2X IP packets. Various aspects may include methods for providing and receiving unicast transmission of C-V2X IP packets performed by a modem of a vehicle.

Various aspects may include receiving a unicast C-V2X IP packet, wherein an IP header of the unicast C-V2X IP packet indicates a source port and a destination IP address, determining a destination layer 2 (L2) address based at least in part on the indicated destination IP address, adding a Packet Data Convergence Protocol (PDCP) header indicating the determined destination L2 address to the unicast C-V2X IP packet, and sending the unicast C-V2X IP packet to the determined destination L2 address.

Some aspects may further include receiving a flow registration associating one or more source port and destination IP address pairings with respective destination L2 addresses, and caching the flow registration in a memory available to the modem. In such aspects, determining the destination L2 address based at least in part on the indicated destination IP address may include comparing the indicated source port and the indicated destination IP address to the cached flow registration to determine a matching source port and destination IP address pairing, and determining the destination L2 address as the respective destination L2 address associated with the matching source port and destination IP address pairing in the cached flow registration. In some aspects, the flow registration may associate one or more flow attributes with each respective destination L2 address. Such aspects may further include determining the one or more flow attributes associated with the determined destination L2 address based at least in part on the flow registration. In such aspects, sending the unicast C-V2X IP packet to the determined destination L2 address may include sending the unicast C-V2X IP packet to the determined destination L2 address according to the determined one or more flow attributes. In such aspects, the one or more flow attributes may include a periodicity, a semi-persistent scheduling (SPS) sidelink identifier, a priority, a packet delay budget (PDB), or a transmit power.

Some aspects may further include receiving a destination address registration indicating one or more destination IP address and respective destination L2 address pairings, and storing the one or more destination IP address and respective destination L2 address pairings in an address mapping table in a memory available to the modem, in which determining the destination L2 address based at least in part on the indicated destination IP address may include comparing the indicated destination IP address to the address mapping table to determine a matching destination IP address, and determining the destination L2 address as the respective destination L2 address associated with the matching destination IP address in the address mapping table. Such aspects may further include receiving a flow registration associated with the destination address registration, the flow registration indicating one or more flow attributes to use for all respective destination L2 addresses in the destination address registration, and setting the one or more flow attributes as default flow attributes for the address mapping table. In such aspects, sending the unicast C-V2X IP packet to the determined destination L2 address may include sending the unicast C-V2X IP packet to the determined destination L2 address according to the default flow attributes set for the address mapping table. In such aspects, the one or more flow attributes may include a periodicity, an SPS sidelink identifier, a priority, a PDB, or a transmit power.

In some aspects, the unicast C-V2X IP packet may be a transmission control protocol (TCP) packet or a user datagram protocol (UDP) packet. In some aspects, the determined destination L2 address may be a media access control (MAC) address of another vehicle.

Various aspects may include methods for providing unicast transmission of C-V2X IP packets performed by a processor of a vehicle including generating a unicast C-V2X IP packet to be sent via unicast transmission to another device, wherein an IP header of the unicast C-V2X IP packet indicates a source port and a destination IP address for the other device, and sending the unicast C-V2X IP packet to a modem of the vehicle.

Some aspects may further include, prior to generating the unicast C-V2X IP packet, generating a flow registration associating one or more source port and destination IP address pairings with respective destination L2 addresses, wherein at least one of the one or more source port and destination IP address pairings with respective destination L2 address comprises a pairing of the source port and the destination IP address for the other device associated with a destination L2 address of the other device, and sending the flow registration to the modem of the vehicle. In some aspects, the flow registration may further associate one or more flow attributes with the destination L2 address of the other device. In such aspects, the one or more flow attributes may include a periodicity, an SPS sidelink identifier, a priority, a PDB, or a transmit power. In such aspects, the other device may be another vehicle, and the destination L2 address of the other device may be a media access control (MAC) address of the other vehicle.

Some aspects may further include, prior to generating the unicast C-V2X IP packet, generating a destination address registration indicating one or more destination IP address and respective destination L2 address pairings, wherein at least one of the one or more destination IP address and respective destination L2 address pairings comprises a pairing of the destination IP address for the other device and a destination L2 address of the other device, sending the destination address registration to the modem of the vehicle, generating a flow registration associated with the destination address registration, the flow registration indicating one or more flow attributes to use for all destination L2 addresses indicated in the destination address registration, and sending the flow registration to the modem of the vehicle. In such aspects, the one or more flow attributes may include a periodicity, an SPS sidelink identifier, a priority, a PDB, and/or a transmit power. In such aspects, the processor may be an application processor, the other device may be another vehicle, and the destination L2 address of the other device may be a MAC address of the other vehicle. In various aspects, the unicast C-V2X IP packet may be a TCP packet or a UDP packet.

Further aspects include a vehicle including a vehicle computing device having a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a computing device for use in a vehicle and configured to perform operations of any of the methods summarized above. Further aspects include a vehicle having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
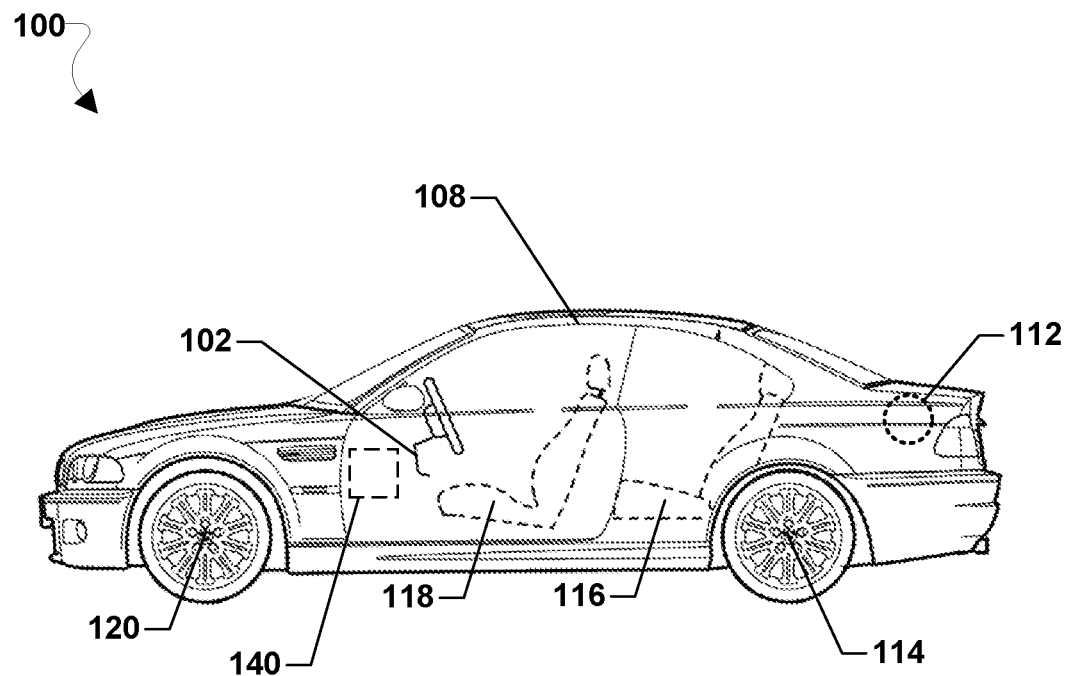
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods for unicast transmission and reception of cellular vehicle-to-everything (C-V2X) Internet Protocol (IP) packets. Various embodiments may enable upper layers in a stack architecture to realize unicast transmission and reception of C-V2X IP packets. In various embodiments, source port and destination IP address pairings may be associated with destination layer 2 (L2) addresses. In various embodiments, a source port indication and destination IP address indication may be added to a unicast C-V2X IP packet, such as a transmission control protocol (TCP) packet, a user datagram protocol (UDP) packet, etc., and the source port and destination IP address indications may be used by a modem to determine the destination L2 address for the unicast C-V2X IP packet. In various embodiments, the destination L2 address may be indicated in a Packet Data Convergence Protocol (PDCP) header added to a unicast C-V2X IP packet, such as a TCP packet, a UDP packet, etc., by the modem.

Various embodiments improve the capabilities and performance of C-V2X communications by enabling unicast IP transmission and reception. The presence of the source port and destination IP address indications enables a modem to differentiate different flows with the same source port and thereby successfully add PDCP headers to unicast C-V2X IP packets, such as TCP packets, UDP packets, etc., with the correct destination L2 address. The ability to differentiate different flows with the same source port using source port and destination IP address pairings associated with destination L2 addresses may enable a modem of a vehicle to support multiple unicast vehicle-to-everything (V2X) flows per source port, thereby improving C-V2X communication capabilities.

As used herein, the term "communication device" refers to any one or all of cellular telephones, smartphones, portable computing devices, driver assistance systems, vehicle controllers, vehicle system controllers, vehicle communication system, infotainment systems, vehicle telematics systems or subsystems, vehicle display systems or subsystems, vehicle data controllers or routers, and similar electronic devices which include a programmable processor and memory and circuitry configured to perform operations as described herein. While the various aspects are particularly useful for in-vehicle communication systems and/or computing devices, the aspects are generally useful in any communication device that includes communication circuitry and a processor that executes application programs.

The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital Signal processor (DSP), a graphics processing unit (GPU), an accelerated processing unit (APU), a sub-system processor, an auxiliary processor, a single-core processor, and a multicore processor. The SoC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. An SoC may be an integrated circuit (IC) configured such that the components of the IC reside on the same substrate, such as a single piece of semiconductor material (e.g., silicon, etc.).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high speed communication circuitry and packaged in close proximity, such as on a single motherboard or in a single mobile communication device. The proximity of the SoCs facilitates high speed communications and the sharing of memory and resources.

The cellular vehicle-to-everything (C-V2X) protocol defined by the 3rd Generation Partnership Project (3GPP) supports direct communication between two vehicle-to-everything (V2X) entities over a PC5 interface. As used herein, a V2X entity may be any communication device configured to support C-V2X communication, including direct communication according to the C-V2X protocol, such as an in-vehicle communication device, a mobile communication device (e.g., a smartphone, laptop, etc.) temporarily placed within a vehicle, a traffic sensor, a communication device (e.g., a smartphone, laptop, etc.) in use by a pedestrian, etc. Direct communications may be supported by device-to-device (D2D) links established over the PC5 interface. The V2X direct communication over the PC5 interface supported by the C-V2X protocol can include vehicle-to-vehicle (V2V) direct communication, vehicle-to-infrastructure (V2I) direct communication, and/or vehicle-to-pedestrian (V2P) direct communication.

In C-V2X communications, such as V2X direct communications over the PC5 interface, each V2X entity sending or receiving unicast C-V2X IP packets, may be identified by its own respective unique Layer 2 (L2) address, also referred to as that entities L2 address. As an example, the media access control (MAC) address each V2X entity may be that V2X entity's destination L2 address. C-V2X packets to be sent to another V2X entity, such as unicast C-V2X packets to be sent over the PC5 interface, may be appended with a PDCP header including the destination L2 address of the V2X entity (e.g., the vehicle, road side unit (RSU), etc.) that is the end destination for the C-V2X packets. The destination L2 address of the V2X entity (e.g., the vehicle, road side unit (RSU), etc.) that is the end destination for the C-V2X packet may enable a modem of a transmitting communication device, such as a modem of a transmitting vehicle, to handle and send the C-V2X packet correctly via the modem's Layer 2 sublayers via C-V2X transmissions. A modem's Layer 2 sublayers may include a PDCP layer, a radio link control (RLC) layer, a MAC layer, etc. C-V2X transmissions may include V2X transmissions over the PC5 interface, wireless wide area network (WWAN) transmissions over the Uu interface, etc. Specifically, as part of converting C-V2X IP packets transferred from a higher data layer (e.g., Layer 3)(such packets often referred to as service data units (SDUs)) into one or more packets for transmission over the air, such as over the PC5 interface, over the Uu interface, etc., via a lower layer (e.g., Layer 1)(such packets often referred to as protocol data units (PDUs)), the destination L2 address of the V2X entity (e.g., the vehicle, road side unit (RSU), etc.) that is the end destination for the C-V2X IP packet may be written into the one or more PDUs, such as by being indicated in a PDCP header appended to the C-V2X IP packet. The destination L2 address may be recognized by Layer 2 sublayers (e.g., the PDCP layer, RLC layer, MAC layer, etc.) in the stack architecture of the V2X entities and the destination L2 address serves to identify the destination of each packet to be transmitted.

In example C-V2X implementations, a V2X entity, such as a vehicle, etc., may include an application processor (AP)(e.g., an automotive AP, etc.) connected to a modem. The AP may run various applications and/or stacks, such as Intelligent Transportation System (ITS) stacks, telemetry applications, application programming interfaces (APIs), etc., that reside over a high level operating system (HLOS) of the AP. The AP may be connected to the modem via various physical interconnects, such as peripheral component interconnect express (PCIe) connections, universal serial bus (USB) connections, high speed inter-chip (HSIC) connections, Ethernet connections, etc. Via one or more interconnections between the AP and the modem, the AP and modem may exchange data with one another. For example, the applications and/or stacks running on the AP may send C-V2X packets, such as C-V2X IP packets (e.g., TCP packets, UDP packets, etc.) or C-V2X non-IP packets, for transmission to other devices, such as other vehicles, to the modem via the one or more interconnections between the AP and the modem. The modem may send the C-V2X packets (IP or non-IP) over the air, such as via device-to-device transmissions over the PC5 interface, WWAN transmissions over the Uu interface, etc. Similarly, the modem may receive C-V2X packets (IP or non-IP) over-the-air, such as via device-to-device transmissions over the PC5 interface, WWAN transmissions over the Uu interface, etc., and may provide the C-V2X packets to the AP via the one or more interconnections between the AP and the modem.

For broadcast transmissions, in response to receiving a C-V2X IP packet from a higher layer (e.g., a layer 3 application and/or stack, such as an ITS stack, telemetry application, API, etc.), an upper layer of the modem stack (e.g., a PDCP layer), may be configured to identify that the C-V2X IP packet should be given to the broadcast PC5 MAC layer based on a mapping of the source port indicated in the IP header of the C-V2X IP packet to a service identifier (ID) of the destination device mapped to the destination device's destination L2 address (e.g., the destination device's MAC address). While suitable for broadcast transmission, this source port to service ID to destination L2 address will not work for many unicast transmissions, such as transmissions of TCP packets, transmissions of UDP packets, etc., as the same source destination may be simultaneously servicing different destination points with different destination L2 addresses. As many unicast transmission protocols, such as TCP, UDP, etc., provide for listening to a well-known port and servicing many clients, the same port may be utilized by different clients and the source port may be associated with several service IDs and/or destination L2 addresses. As examples, RSUs may operate TCP and/or UDP servers that use the same source port with different destination L2 addresses for different unicast flows, different onboard units (OBUs) with different destination L2 addresses may be serviced by the same source port with different unicast flows.

In various embodiments, source port and destination IP address pairings may be associated with destination L2 addresses, a source port indication and destination IP address indication may be added to a unicast C-V2X IP packet, such as a transmission control protocol (TCP) packet, a user datagram protocol (UDP) packet, etc., and the source port and destination IP address indications may be used by a modem to determine the destination L2 address for the unicast C-V2X IP packet. The presence of the source port and destination IP address indications may enable the modem to differentiate different flows with the same source port. In various embodiments, a higher layer (e.g., a layer 3 application and/or stack, such as an ITS stack, telemetry application, API, etc.) may include the source port indication and destination IP address indication in an IP header of a unicast C-V2X IP packet sent to a modem (e.g., an upper layer of the modem stack (e.g., a PDCP layer)). In various embodiments, a modem may determine a destination L2 address based at least in part on the indicated destination IP address in the IP header of the C-V2X packet. The destination L2 address may be indicated in a PDCP header added to a unicast C-V2X IP packet, such as a TCP packet, a UDP packet, etc., by the modem. In this manner, the C-V2X IP packet with the added PDCP header indicating the destination L2 address may be a PDCP PDU sent to lower layers (e.g., RLC layer, MAC layer, PHY layer, etc.) of the modem stack and to the destination via over the air unicast transmission.

In various embodiments, a higher layer (e.g., a layer 3 application and/or stack, such as an ITS stack, telemetry application, API, etc.) may negotiate flow registrations with a modem (e.g., an upper layer of the modem stack (e.g., a PDCP layer)). Flow registrations may define one or more flow attributes to be used for the transmission of the unicast C-V2X IP packets on a flow, such as a periodicity, a semi-persistent scheduling (SPS) sidelink identifier, a priority, a packet delay budget (PDB), a transmit power, etc. Flow registrations may associate one or more source and destination IP address pairings with respective destination L2 addresses.

In some embodiments, flow registrations may be negotiated for each unicast destination. In some embodiments, a modem may cache flow registrations for use in determining destination L2 addresses for received unicast C-V2X IP packets and/or for determining flow attributes for received unicast C-V2X IP packets. In some embodiments, a modem may compare the indicated source port and the indicated destination IP address in a received unicast C-V2X IP packet to the cached flow registration to determine a matching source port and destination IP address pairing. In some embodiments, a modem may determine the destination L2 address for a received unicast C-V2X IP packet as the respective destination L2 address associated with the matching source port and destination IP address pairing in the cached flow registration. In some embodiments, a modem may determine the one or more flow attributes associated with a destination L2 address based on the flow registration and may send the unicast C-V2X IP packet to the destination L2 address according to the determined one or more flow attributes.

In some embodiments, flow attributes may apply to all destination L2 addresses associated with the same source port. For example, all flows on the same source port may have the same priority and same transmit power. The only difference between the flows may be the destination L2 addresses.

In some embodiments, a higher layer (e.g., a layer 3 application and/or stack, such as an ITS stack, telemetry application, API, etc.) may negotiate a single default flow registration with a modem (e.g., an upper layer of the modem stack (e.g., a PDCP layer)) for flows to all destination L2 addresses associated with the same source port. In some embodiments, a higher layer (e.g., a layer 3 application and/or stack, such as an ITS stack, telemetry application, API, etc.) may generate a destination address registration indicating destination IP address and destination L2 address pairings and send that destination address registration to a modem. The modem may store the destination IP address and destination L2 address pairings in an address mapping table.

In some embodiments, a higher layer (e.g., a layer 3 application and/or stack, such as an ITS stack, telemetry application, API, etc.) may generate a flow registration associated with the destination address registration and send the flow registration to a modem. The flow registration may indicate one or more flow attributes to use for all destination L2 addresses in the destination address registration.

In some embodiments, the modem may set the one or more flow attributes as default flow attributes for the address mapping table. In some embodiments, the modem may compare the indicated destination IP address in a received unicast C-V2X IP packet to the address mapping table to determine a matching destination IP address. The modem may determine the destination L2 address as the respective destination L2 address associated with the matching destination IP address in the address mapping table. The modem may send the received unicast C-V2X IP packet to the determined destination L2 address according to the default flow attributes set for the address mapping table.

Figure 1B:
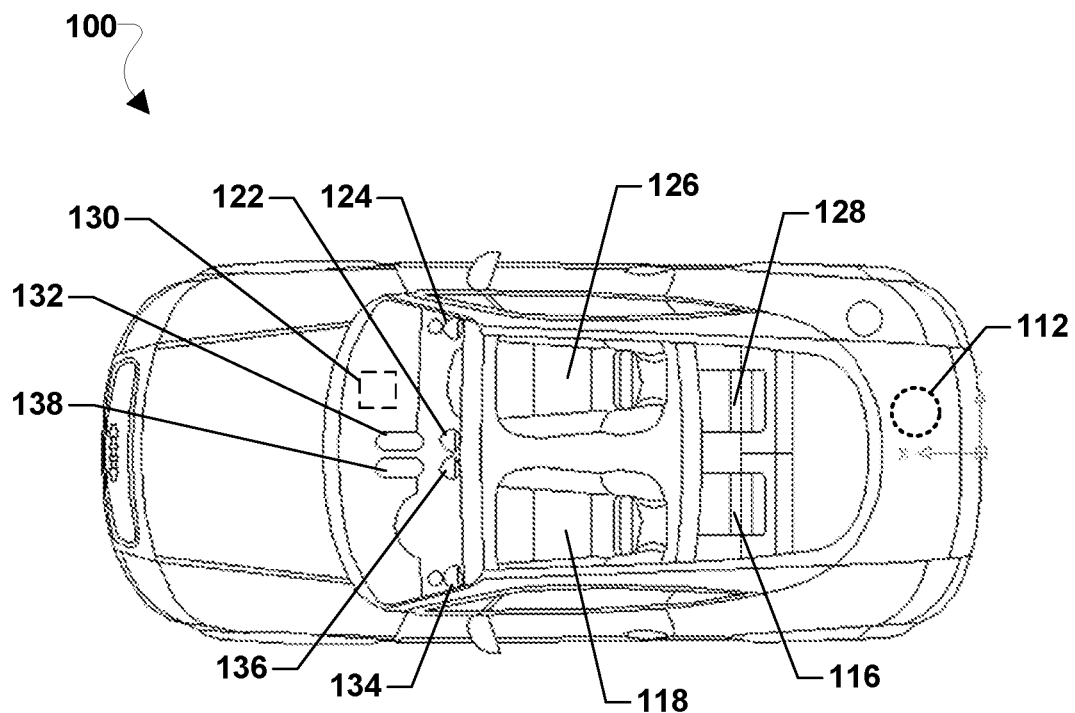

Various embodiments may be implemented within a variety of vehicles, an example vehicle 100 of which is illustrated in FIGS. 1A and 1B. With reference to FIGS. 1A and 1B, a vehicle 100 may include a vehicle computing device 140 (also referred to as an in-vehicle communication device) and a plurality of sensors 102-138, including satellite geo-positioning system receivers 108, occupancy sensors 112, 116, 118, 126, 128, tire pressure sensors 114, 120, cameras 122, 136, microphones 124, 134, impact sensors 130, radar 132, and lidar 138.

The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a vehicle computing device 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle computing device 140, which is sometimes referred to as an onboard unit (OBU), may be configured with processor-executable instructions to perform various embodiments using information received from various sensors, particularly the cameras 122, 136. In some embodiments, the vehicle computing device 140 may supplement the processing of camera images using distance and relative position (e.g., relative bearing angle) that may be obtained from radar 132 and/or lidar 138 sensors. The vehicle computing device 140 may further be configured to control steering, breaking and speed of the vehicle 100 when operating in an autonomous or semi-autonomous mode using information regarding other vehicles determined using various embodiments.

Figure 1C:
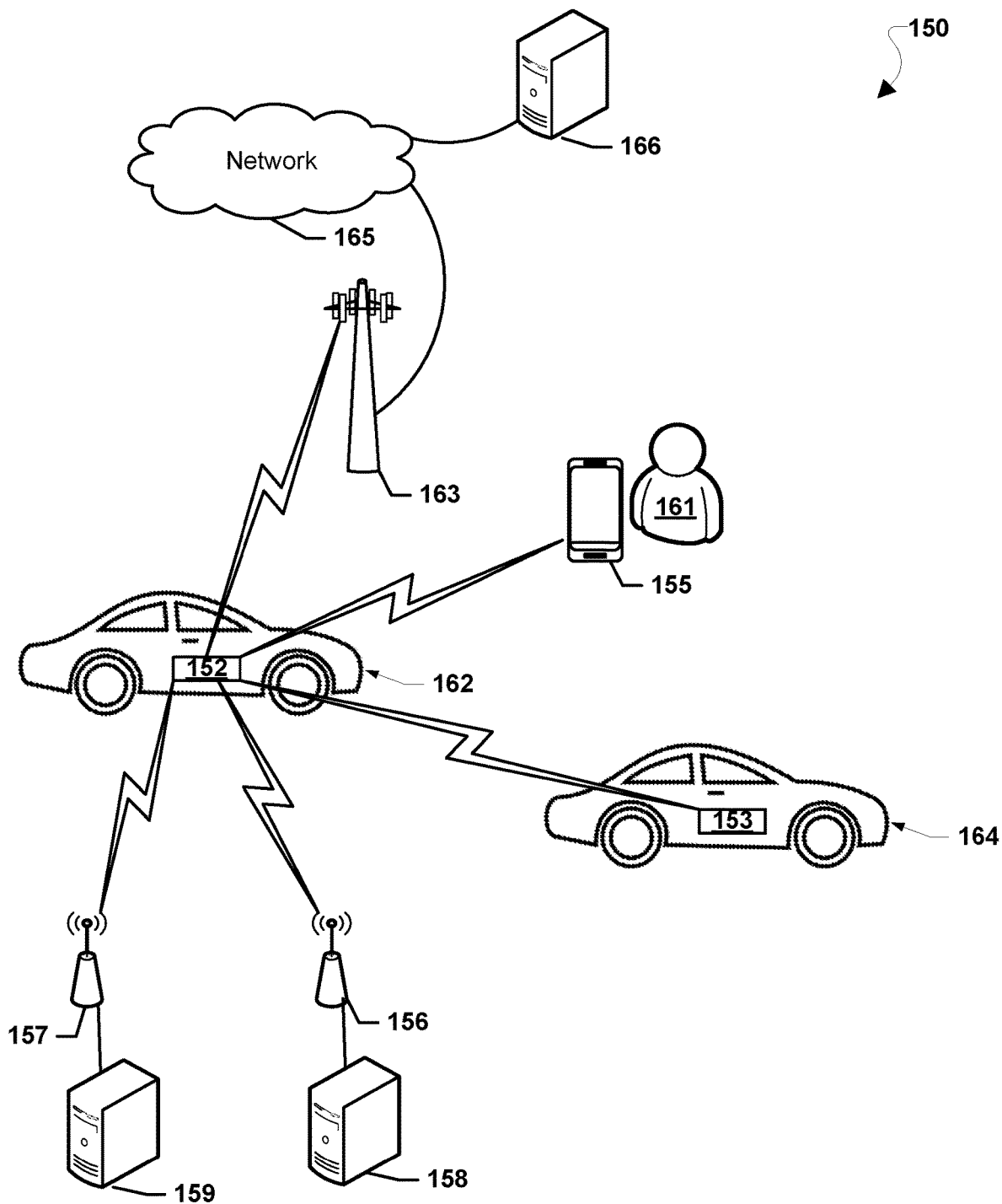
FIG. 1C illustrates an example cellular vehicle-to-everything (C-V2X) system suitable for implementing various embodiments.

FIG. 1C illustrates an example C-V2X system 150 suitable for implementing various embodiments. With reference to FIGS. 1A-1C, a C-V2X system 150 may include an in-vehicle communication device 152 (also referred to as a vehicle computing device) configured to exchange wireless communications with other communication devices around a vehicle 162 in which the in-vehicle communication device 152 is located. The vehicle 162 may be any type of vehicle, such as an autonomous vehicle (e.g., driverless car, etc.), semi-autonomous vehicle, remotely operated vehicle, etc. The in-vehicle communication device 152 may be a computing device mounted in the vehicle 162 or may be a mobile communication device (e.g., a smartphone, laptop, etc.) temporarily placed within the vehicle 162. The C-V2X system 150 may include various devices in addition to the in-vehicle communication device 152, such as another in-vehicle communication device 153 (also referred to as a vehicle computing device) of another vehicle 164, transmitters 156 and 157 connected to Road Side Units (RSUs) 158, 159, communication device 155 (e.g., a smartphone, laptop, etc.), cellular tower or base station 163 connected to a network 165 and network server 166, etc. Various components of the C-V2X system 150 may be configured to operate as an ITS network to support intercommunication and safety for surface vehicles.

The in-vehicle communication device 152 may be configured to perform vehicle-to-vehicle (V2V) communications, vehicle-to-infrastructure (V2I) communications, and vehicle-to-pedestrian (V2P) communications. For example, the in-vehicle communication device 152 may establish a device-to-device (D2D) link with another in-vehicle communication device 153 of another vehicle 164 to exchange V2V communications. As another example, the in-vehicle communication device 152 may establish D2D links with transmitters 156 and 157 connected to RSUs 158, 159 to exchange V2I communications. As a further example, the in-vehicle communication device 152 may establish a D2D link with the communication device 155, such as a smartphone, laptop, etc., of a user 161 to exchange V2P communications. The D2D links between the in-vehicle communication device 152, the in-vehicle communication device 153, the communication device 155, the RSUs 158, 159 may be communication links established independent of a cellular network, such as links establish in the dedicated ITS 5.9 gigahertz (GHz) spectrum. As specific examples, the D2D links may be dedicated short range communication (DSRC) links, LTE direct (LTE-D) links, links established via the PC5 interface, or any other type link supporting direct device communication.

The in-vehicle communication device 152 may be configured to perform vehicle-to-network (V2N) communications. For example, the in-vehicle communication device 152 may establish network-to-device links with a cellular tower or base station 163 connected to a network 165 and other vehicles 164 to exchange V2N communications. The network-to-device links may include, without limitation, uplinks (or reverse links), downlinks (or forward links), bidirectional links, etc. The network-to-device links may be established according to mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc. As a specific example, the network-to-device links may be WWAN links via the Uu interface.

In some embodiments, the in-vehicle communication device 152 and the cellular tower or base station 163 may include 5G NR functionality with an air interface based on orthogonal frequency division multiplexing (OFDM). The functionality of the cellular tower or base station 163 may be similar in one or more aspects to (or incorporated into) the functionality of a cellular IoT (CIoT) base station (C-BS), a NodeB, an evolved NodeB (eNodeB), radio access network (RAN) access node, a radio network controller (RNC), a base station (BS), a macro cell, a macro node, a Home eNB (HeNB), a femto cell, a femto node, a pico node, or some other suitable entity based on the radio technology used to establish the network-to-device links between the cellular tower or base station 163 and the in-vehicle communication device 152. The cellular tower or base station 163 may be in communication with respective routers that may connect to the network 165 (e.g., core network, Internet, etc.). Using the connections to the cellular tower or base station 163, the in-vehicle communication device 152 may exchange data with the network 165 as well as devices connected to the network 165, such as other vehicles 164 or any other communication device connected to the network 165.

Figure 2:
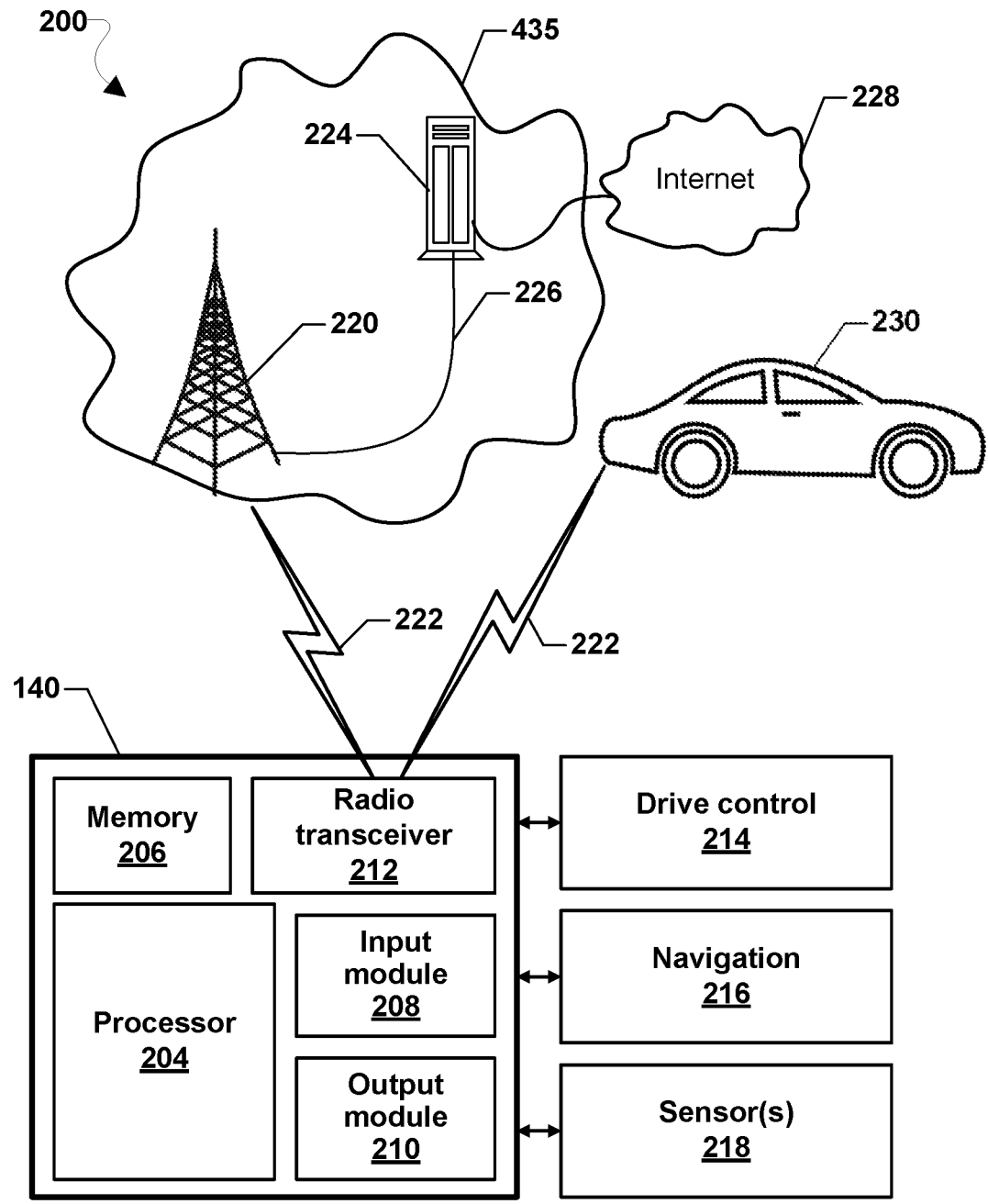
FIG. 2 is a system block diagram illustrating components of a vehicle computing device in communication with road side units and other vehicles suitable for implementing various embodiments.

FIG. 2 is a component block diagram illustrating a system 200 of components and support systems suitable for implementing various embodiments. With reference to FIGS. 1A-2A, the system 200 may include vehicle computing devices 140 (and/or 152, 153) in vehicles 100, 162, 164, 230 that are configured to communicate via wireless communications (e.g., C-V2X protocol messages 222, such as C-V2X messages sent as unicast C-V2X IP packets (e.g., TCP packets, UDP packets, etc.)) with other vehicles and RSUs 220, and RSUs 220 may communicate with network servers 224 (e.g., via wireless or wired communication links 226).

The road side units 220, the network servers 224 and the wired 226 and wireless communication links connecting such units together into an integrated communication and tracking system may comprise and are referred to generally herein as a surface transportation network 435. Network servers 224 of the surface transportation network 435 may be coupled to wide area network, such as the Internet 228, and be configured to route permanent vehicle information to computing platforms of authorized parties and a certificate authority 430 using any of a variety of known network message transport protocols.

A vehicle computing device 140 (and/or 152, 153), which may include various circuits and devices used to control the operation of the vehicle 100, 162, 164, 230 as well as communicate with other devices within a surface transportation network 200.

In the example illustrated in FIG. 2, the vehicle computing device 140 (and/or 152, 153) includes a processor 204, memory 206, an input module 208, an output module 210 and a radio transceiver 212. The vehicle computing device 140 (and/or 152, 153) may be coupled to and configured to control drive control components 214, navigation components 216, and one or more sensors 218 of the vehicle 100, 162, 164, 230. The processor 204 that may be configured with processor-executable instructions to control maneuvering, navigation, and/or other operations of the vehicle 100, 162, 164, 230, including operations of various embodiments. The processor 204 may be coupled to the memory 206. The vehicle computing device 140 (and/or 152, 153) may include the input module 208, the output module 210, and the radio transceiver 212.

The radio transceiver 212 may be configured to transmit and receive C-V2X protocol messages (such as C-V2X messages sent as unicast C-V2X IP packets (e.g., TCP packets, UDP packets, etc.)) with RSUs 220 and other vehicles 230.

The input module 208 may receive sensor data from one or more vehicle sensors 218 as well as electronic signals from other components, including the drive control components 214 and the navigation components 216. The output module 210 may be used to communicate with or activate various components of the vehicle 100, 162, 164, 230, including the drive control components 214, the navigation components 216, and the sensor(s) 218.

The vehicle computing device 140 (and/or 152, 153) may be coupled to the drive control components 214 to control physical elements of the vehicle 100, 162, 164, 230 related to maneuvering and navigation of the vehicle, such as the engine, motors, throttles, steering elements, flight control elements, braking or deceleration elements, and the like. The drive control components 214 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The vehicle computing device 140 (and/or 152, 153) may be coupled to the navigation components 216, and may receive data from the navigation components 216 and be configured to use such data to determine the present position and orientation of the vehicle 100, 162, 164, 230, as well as an appropriate course toward a destination. In various embodiments, the navigation components 216 may include or be coupled to a global navigation satellite system (GNSS) receiver system (e.g., one or more Global Positioning System (GPS) receivers) enabling the vehicle 100, 162, 164, 230 to determine its current position using GNSS signals. Alternatively, or in addition, the navigation components 216 may include radio navigation receivers for receiving navigation beacons or other signals from radio nodes, such as Wi-Fi access points, cellular network sites, radio station, remote computing devices, other vehicles, etc. Through control of the drive control elements 214, the processor 204 may control the vehicle 100, 162, 164, 230 to navigate and maneuver. The processor 204 and/or the navigation components 216 may be configured to communicate with a road side unit 230 to receive commands to control maneuvering, receive data useful in navigation, provide real-time position reports, and assess other data.

The vehicle computing device 140 (and/or 152, 153) may be coupled to one or more sensors 218. The sensor(s) 218 may include the sensors 102-138 as described, and may the configured to provide a variety of data to the processor 204.

The processor 204 of the vehicle computing device 140 (and/or 152, 153) may be configured to receive information regarding the vehicle's position and direction of travel (e.g., from navigation components 216), speed (e.g., from drive control components 214), and other information (e.g., from sensor(s) 218) and generate C-V2X messages, such as C-V2X messages sent as unicast C-V2X IP packets (e.g., TCP packets, UDP packets, etc.)), for transmission by the radio transceiver 212.

The processor 204 of the vehicle computing device 140 (and/or 152, 153) may be configured to receive C-V2X messages, such as C-V2X messages sent as unicast C-V2X IP packets (e.g., TCP packets, UDP packets, etc.)), from other vehicles 230 and use such messages in controlling vehicle operations (e.g., providing other vehicle positions to drive control components 214 and/or navigation components 216). As an example, the processor 204 may also be configured to receive and process other C-V2X messages from RSUs 220, and use the information in such messages and use such information in controlling vehicle operations, notifying the operator of safety conditions, etc.

While the vehicle computing device 140 (and/or 152, 153) is described as including separate components, in some embodiments some or all of the components (e.g., the processor 204, the memory 206, the input module 208, the output module 210, and the radio transceiver 212) may be integrated in a single device or module, such as a system-on-chip (SOC) processing device. Such an SOC processing device may be configured for use in vehicles and be configured, such as with processor-executable instructions executing in the processor 204, to perform operations of various embodiments when installed into a vehicle.

Figure 3:
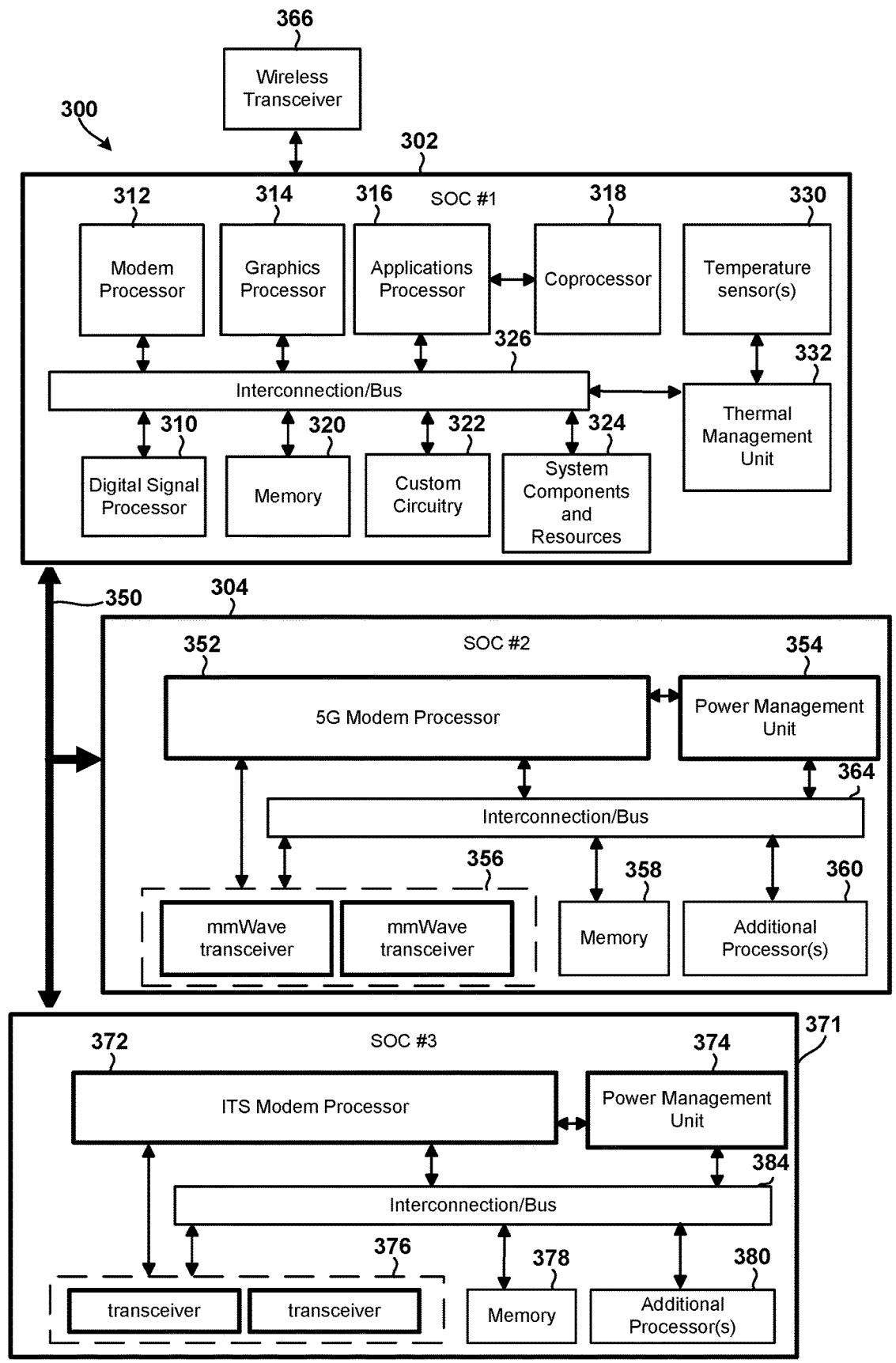
FIG. 3 is a block diagram illustrating components of an example system on chip for use in a vehicle that may be configured to broadcast, receive, and/or otherwise use C-V2X messages in accordance with various embodiments.

The various embodiments may be implemented on a number of single processor and multiprocessor communication devices, including an SoC and/or a SIP. FIG. 3 illustrates an example SIP 300 architecture that may be configured to implement methods for sending path history in accordance with various embodiments. With reference to FIGS. 1A-3, example SIP 300 architecture may be implemented in any SIP, and may be used in any communication device (e.g., in-vehicle communication device 140, in-vehicle communication device 152, in-vehicle communication device 153, RSU 158, 159, etc.) implementing various embodiments.

In the example illustrated in FIG. 3, the SIP 300 includes three SoCs 302, 304, 371 that include processors, modems and memory, and may be configured to perform operations of various embodiments. In some embodiments, the first SoC 302 may operate as a central processing unit (CPU) of the communication device that carries out the instructions of software application programs by performing the arithmetic, logical, control and input/output (I/O) operations specified by the instructions. In some embodiments, the second SoC 304 may operate as a specialized processing unit. For example, the second SoC 304 may operate as a specialized 5G processing unit responsible for managing high volume, high speed (e.g., 5 Gbps, etc.), and/or very high frequency short wave length (e.g., 28 GHz mmWave spectrum, etc.) communications to support 5G NR functionality with an air interface based on OFDM. In some embodiments, the third SoC 371 may operate as a specialized processing unit. For example, the third SoC 371 may operate as a specialized C-V2X processing unit responsible for managing V2V, V2I, and V2P communications over D2D links, such as D2D links establish in the dedicated ITS 5.9 GHz spectrum communications. The SoCs and organization of functionality illustrated in FIG. 3 are a non-limiting example of an SIP as other architectures and organizations of functionality among SoCs, including fewer or more SoCs, are contemplated. For ease of reference, the term "modem" is used herein and in the claims to refer to the integration of modem circuitry, one or more processors (e.g., a modem processor, DSP, etc.), and memory, which may be integrated in an SoC (e.g., 304 or 371), and configured with processor-executable instructions (e.g., in firmware and/or software) to perform operations of various embodiments.

In the example illustrated in FIG. 3, the first SoC 302 includes a digital Signal processor (DSP) 310, a modem processor 312, a graphics processor 314, an application processor (AP) 316, one or more coprocessors 318 (e.g., vector co-processor) connected to one or more of the processors, memory 320, custom circuitry 322, system components and resources 324, an interconnection/bus module 326, one or more temperature sensors 330, a thermal management unit 332, and a wireless transceiver 366 configured to send and receive wireless communications via an antenna (not shown) to/from other devices. The second SoC 304 includes a 5G modem processor 352, a power management unit 354, an interconnection/bus module 364, a plurality of mmWave transceivers 356, memory 358, and various additional processors 360, such as an applications processor, packet processor, etc. The third SoC 371 includes an ITS modem processor 372, a power management unit 374, an interconnection/bus module 384, a plurality of transceivers 376 (e.g., transceivers configured to operate in the dedicated ITS 5.9 GHz spectrum), memory 378, and various additional processors 380, such as an applications processor, packet processor, etc.

Each processor 310, 312, 314, 316, 318, 352, 360, 372, 380 may include one or more cores, and each processor/core may perform operations independent of the other processors/cores. For example, the first SoC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360, 372, 380 may be included as part of a processor cluster architecture (e.g., a synchronous processor cluster architecture, an asynchronous or heterogeneous processor cluster architecture, etc.). As a specific example, a higher layer running on the AP 316, additional processors 360, 380 (e.g., a layer 3 application and/or stack, such as an ITS stack, telemetry application, API, etc.) may execute operations to generate and send unicast C-V2X packets to upper layers (e.g., a PDCP layer) of the modem processors 312, 352, 372.

The first, second, and third SoCs 302, 304, 371 may include various system components, resources and custom circuitry for managing sensor Data, analog-to-digital conversions, wireless data transmissions, and for performing other specialized operations, such as decoding data packets and processing encoded audio and video signals for rendering in a web browser or other display application. For example, the system components and resources 324 of the first SoC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, autonomous driving systems, traffic sign recognition systems, parking assistance systems, telematics units, tire pressure monitoring systems, collision warning systems, display systems, vehicle buses, etc.

The first, second, and third SoCs 302, 304, 371 may communicate via one or more interconnection/bus modules 350. The processors 310, 312, 314, 316, 318 may be interconnected to one or more memory elements 320, system components and resources 324, and custom circuitry 322, and a thermal management unit 332 via an interconnection/bus module 326. Similarly, the processors 352, 360 may be interconnected to the power management unit 354, the mmWave transceivers 356, memory 358, and various additional processors 360 via the interconnection/bus module 364. Similarly, the processors 372, 380 may be interconnected to the power management unit 374, the transceivers 376, memory 378, and various additional processors 380 via the interconnection/bus module 384. The interconnection/bus module 326, 350, 364, 384 may include an array of reconfigurable logic gates and/or implement a bus architecture (e.g., CoreConnect, AMBA, etc.). Communications may be provided by advanced interconnects, such as high-performance networks-on chip (NoCs). The various interconnection/bus modules 326, 350, 364, 384 may include physical interconnects, such as PCIe connections, USB connections, HSIC connections, Ethernet connections, etc.

The first, second, and/or third SoCs 302, 304, 371 may further include an input/output module (not illustrated) for communicating with resources external to the SoCs. Resources external to the SoCs may be shared by two or more of the internal SoC processors/cores.

In addition to the SIP 300 discussed above, the various aspects may be implemented in a wide variety of communication devices, which may include a single processor, multiple processors, multicore processors, or any combination thereof.

Figure 4:
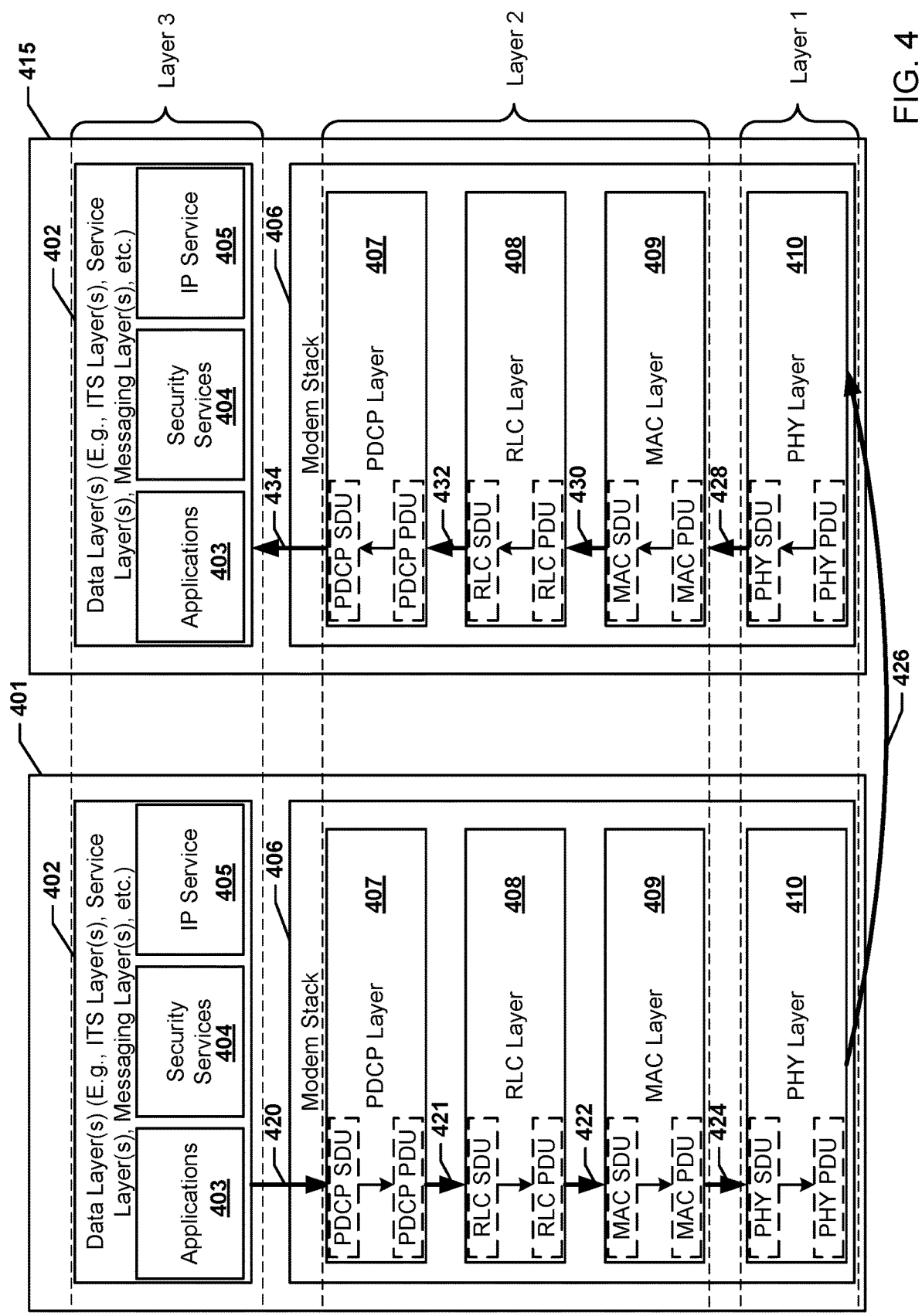
FIG. 4 is a block diagram illustrating an example of interactions between stack architecture layers in a transmitting communication device and a receiving communication device in accordance with various embodiments.

FIG. 4 illustrates interactions between stack architecture layers in a transmitting communication device 401 and a receiving communication device 415 in accordance with various embodiments. With reference to FIGS. 1-4, the communication devices 401, 415 may each be any type of communication device (e.g., in-vehicle communication device 140, 152, 153, RSUs 158, 159, communication device 155, SIP 300, etc.) implementing various embodiments. As a specific example, the communication devices 401, 415 may be communication devices configured to exchange information using C-V2X communications, such as via unicast C-V2X IP transmission, such as TCP transmissions, UDP transmissions, etc. In various embodiments, layers in stack architecture of the communication device 401 may form logical connections with corresponding layers in the stack architecture of the communication device 415. The stack architecture may be distributed among one or more processors (e.g., the processors 310, 312, 314, 316, 318, 352, 360, 372, 380). While illustrated with respect to one radio protocol stack, in a multi-subscriber identity module (SIM) (multi-SIM) communication device, the stack architecture may include multiple protocol stacks, each of which may be associated with a different SIM (e.g., two protocol stacks associated with two SIMs, respectively, in a dual-SIM communication device). While described below with reference to LTE communication layers, the stack architecture may support any of variety of standards and protocols for wireless communications, and/or may include additional protocol stacks that support any of variety of standards and protocols wireless communications.

Each communication device 401, 415 may include one or more higher data layers 402 configured to exchange data with a modem stack (or radio protocol stack) 406. As examples, the higher data layers 402 may be one or more ITS layers, one or more service layers, one or more messaging layers, application layers, etc. As examples, the functionality performed in the higher data layers 402 may include applications 403 (e.g., ITS safety critical applications, ITS non-safety critical applications, messaging applications, etc.), security services 404, Internet Protocol (IP) services 405 (e.g., Transmission Control Protocol (TCP) services, Uniform Datagram Protocol (UDP) services, etc.), application programming interface (API) services, other higher data layer functionality, or any combination thereof. The higher data layers 402 may, individually or collectively, be sublayers of Layer 3 in the stack architecture.

In some embodiments, the higher data layers 402 and the modem stack 406 on the communication device 401, 415 may be running on the same processor of the communication device 401, 415. In some embodiments, the higher data layers 402 and the modem stack 406 on the communication device 401, 415 may run on different processors of the communication device 401, 415. As an example, the higher data layers 402 may run on an AP (e.g., AP 316) and the modem stack 406 may run on a modem processor (e.g., modem processor 312, modem processor 352, modem processor 372). While illustrated in FIG. 4 as being on the same communication device 401, 415, in some embodiments, the higher data layers 402 may run on a processor of a separate communication device.

In some embodiments, the modem stack 406 may include a packet data convergence protocol (PDCP) layer 407, a radio link control (RLC) layer 408, a media access control (MAC) layer 409, and a physical (PHY) layer 410. The PHY layer 410 may be the lowest layer of the modem stack 406 and the PDCP layer 407 may be the highest layer of the modem stack 406. The PDCP layer 407, RLC layer 408, and MAC layer 409 may be sublayers of Layer 2 in the stack architecture. The PHY layer 410 may be a sublayer of Layer 1 in the stack architecture.

The PDCP layer 407 may handle PDCP packets and may provide multiplexing between different radio bearers and logical channels, compression, ciphering, and/or integrity protection for the PDCP packets. The PDCP layer 407 may receive packets from the higher data layers 402 and may output packets to the higher data layers 402. The PDCP layer 407 may receive packets from the RLC layer 408 and may output packets to the RLC layer 408. As specific examples, in the uplink, the PDCP layer 407 may provide functions including multiplexing between different radio bearers and logical channels, sequence number addition, handover data handling, integrity protection, ciphering, and header compression. In the downlink, the PDCP layer 407 may provide functions that include in-sequence delivery of data packets, duplicate data packet detection, integrity validation, deciphering, and header decompression.

The RLC layer 408 may handle RLC packets and may provide error correction, concatenation, segmentation, reassembly, reordering, duplication detection, error detection, and/or error recovery for the RLC packets. Additionally, the RLC layer 408 may buffer RLC packets in a reception buffer, such as to support reordering, await missing RLC packets, etc. The RLC layer 408 may operate in different modes, such as an acknowledge mode (AM), unacknowledged mode (UM), and transparent mode (TM). The RLC layer 408 may receive packets from the PDCP layer 407 and may output packets to the PDCP layer 407. The RLC layer 408 may receive packets from the MAC layer 409 and may output packets to the MAC layer 409. As specific examples, in the uplink, the RLC layer 408 may provide segmentation and concatenation of upper layer data packets, retransmission of lost data packets, and Automatic Repeat Request (ARQ). In the downlink, the RLC layer 408 functions may include reordering of data packets to compensate for out-of-order reception, reassembly of upper layer data packets, and ARQ.

The MAC layer 409 may handle MAC packets and may provide frame delimiting/recognition, addressing, and/or error protection for the MAC packets. Additionally, the MAC layer may be responsible for hybrid automatic repeat request (HARQ) operations. The MAC layer 409 may receive packets from the RLC layer 408 and may output packets to the RLC layer 408. The MAC layer 409 may receive packets from the PHY layer 410 and may output packets to the PHY layer 410. As specific examples, in the uplink, the MAC layer 409 may provide functions including multiplexing between logical and transport channels, random access procedure, logical channel priority, and hybrid-ARQ (HARQ) operations. In the downlink, the MAC layer 409 functions may include channel mapping within a cell, de-multiplexing, discontinuous reception (DRX), and HARQ operations.

The PHY layer 410 may handle PHY packets and may provide the communication interface between the hardware supporting the physical transmission medium (e.g., transceivers, antennas, etc.) and the higher layers of the modem stack 406. The PHY layer 410 may convert PHY packets into a bitstream for transmission and/or convert a received bitstream into PHY packets. The PHY layer 410 provide encoding, transmission, reception, and/or decoding for the PHY packets. The PHY layer 410 may receive packets from the MAC layer 409 and may output packets to the MAC layer 409.

The packets transferred to/from a higher data layer of the modem stack 406 may be referred to as service data units (SDUs) in a given layer and packets transferred to/from a lower layer of the modem stack 406 may be referred to as protocol data units (PDUs). For example, the packets received into the RLC layer 408 from the PDCP layer 407, as well as the packets transferred from the RLC layer 408 to the PDCP layer 407, may be referred to as RLC SDUs. Similarly, the packets received into the RLC layer 408 from the MAC layer 409, as well as the packets transferred from the RLC layer 408 to the MAC layer 409, may be referred to as RLC PDUs.

A layer's SDU may be the next higher layer's PDU, just as the layer's PDU may be the next lower layer's SDU. For example, a PDCP PDU sent to the RLC layer 408 from the PDCP layer 407 may be referred to as an RLC SDU upon receipt by the RLC layer 408. Similarly, a MAC SDU sent from the MAC layer 409 to the RLC layer 408 may be referred to as an RLC PDU upon receipt by the RLC layer 408.

Layers within the protocol stack may convert PDUs to SDUs and SDUs to PDUs by performing on the packets various operations assigned to that layer. For example, an RLC SDU may be segmented by the RLC layer 408 to cover the RLC SDU into one or more RLC PDUs. Similarly, a plurality of received RLC PDUs may be reordered and reassembled to covert the plurality of received RLC PDUs to an RLC SDU. Additionally, a layer may add data to a packet to covert an SDU to a PDU or a layer may remove data from a packet to convert a PDU to an SDU. For example, an RLC layer 408 may add a packet header/footer to an RLC SDU to convert the RLC SDU to an RLC PDU. Similarly, an RLC layer 408 may remove a packet header/footer from an RLC PDU to covert the RLC PDU to an RLC SDU.

Referring to FIG. 4, the following is an example of packet handling when one communication device 401 transmits a communication that is received by another communication device 415.

An application of the higher data layer 402 of the transmitting communication device 401 may generate a packet of a message 420 for transmission to an application 403 of the receiving communication device. For example, the packet of a message 420 may be a unicast C-V2X IP packet, such as a TCP packet, UDP packet, etc. The packet of the message 420 may be sent from the higher data later 401 to the PDCP layer 407 of the modem stack 406 on the transmitting communication device 401. In various embodiments, when the packet of the message 420 may be a unicast C-V2X IP packet, such as a TCP packet, UDP packet, etc., the higher data layer 402 may indicate a source port and a destination IP address of the receiving communication device in an IP header of the unicast C-V2X IP packet.

The PDCP layer 407 may receive the packet of the message 420 as a PDCP SDU and convert the PDCP SDU to a PDCP PDU 421. The PDCP layer 407 may transfer the PDCP PDU 421 to the lower RLC layer 408. The PDCP layer 407 may determine a destination L2 address of the receiving communication device. The PDCP layer 407 may add the destination L2 address in a PDCP header added to the PDCP SDU to convert the PDCP SDU to a PDCP PDU 421.

The RLC layer 408 may receive the PDCP PDU 421 as an RLC SDU, and may convert the RLC SDU (i.e., the PDCP PDU 421) to one or more RLC PDUs 422 by, for example, adding an RLC packet header/footer and/or applying segmentation. As an example, segmentation to split the RLC SDU into multiple RLC PDUs 422 may be needed when the RLC SDU (i.e., the PDCP PDU 421) is larger than a maximum RLC PDU size. When segmentation is applied to convert the RLC SDU into multiple RLC PDUs 422, each created RLC PDU 422 may be associated with a single RLC SDU (i.e., a single PDCP PDU 421). Additionally, the RLC layer 408 may add sequence numbers to the one or more RLC PDUs 422. The sequence numbers may indicate an ordering of the one or more RLC PDUs 422. The RLC layer 408 may transfer the one or more RLC PDUs 422 to the lower MAC layer 409.

The MAC layer 409 may receive the one or more RLC PDUs 422 as one or more MAC SDUs. The MAC layer 409 may convert the one or more MAC SDUs (i.e., the one or more RLC PDUs 422) to one or more MAC PDUs 424. For example, the MAC layer 409 may convert the one or more MAC SDUs (i.e., the one or more RLC PDUs 422) by adding HARQ indicators to the MAC SDU (i.e., the one or more RLC PDUs 422) to support HARQ operations. The MAC layer 409 may transfer the one or more MAC PDUs 424 to the lower PHY layer 410

The PHY layer 410 may receive the one or more MAC PDUs as one or more PHY SDUs. The PHY layer 410 may convert the one or more PHY SDUs (i.e., the one or more MAC PDUs 424) to a PHY PDU bitstream for transmission as a flow 426 to the receiving communication device 415. The flow 426 between the communication devices 401, 415 may occur as part of direct communications over the PC5 interface, WWAN transmission over the Uu, etc. In various embodiments, the flow 426 between the communication devices 401, 415 may be a unicast flow.

The PHY layer 410 of the receiving communication device 415 may receive the PHY PDU bitstream flow 426 and convert the PHY PDU bitstream flow 426 to one or more PHY SDUs 428. The PHY layer 410 may transfer the one or more PHY SDUs 428 to the higher MAC layer 409.

The MAC layer 409 may receive the one or more PHY SDUs 428 as one or more MAC PDUs. The MAC layer 409 may convert the one or more MAC PDUs (i.e., one or more PHY SDUs 428) to one or more MAC SDUs 430. Additionally, the MAC layer 409 may perform HARQ operations (e.g., acknowledgements, retransmission requests, etc.) and remove HARQ data from the MAC PDUs. The MAC layer 409 may transfer the one or more MAC SDUs 430 to the higher RLC layer 408.

The RLC layer 408 may receive the one or more MAC SDUs 430 as one or more RLC PDUs. The RLC layer 408 may convert the one or more RLC PDUs (i.e., the one or more MAC SDUs 430) to a single RLC SDU 432. For example, converting the one or more RLC PDUs (i.e., the one or more MAC SDUs 430) to a single RLC SDU 432 may include removing any RLC headers, removing any RLC footers, combining/concatenating multiple RLC PDUs associated with the same RLC SDU together, and reordering RLC PDUs as needed. Additionally, the RLC layer 408 may buffer one or more RLC PDUs in a reception buffer, such as to support reordering, await missing RLC PDUs, etc. The RLC layer 408 may transfer the RLC SDU 432 to the higher PDCP layer 407.

The PDCP layer 407 may receive the RLC SDU 432 as a PDCP PDU, and convert the PDCP PDU (i.e., the RLC SDU 432) to a PDCP SDU 434. The PDCP SDU 434 at the receiving communication device 415 may correspond to the packet of a message 420 originated by the transmitting communication device 401. The PDCP layer 407 may transfer the PDCP SDU 434 to the higher data layer 402 and the application 403.

Figure 5A:
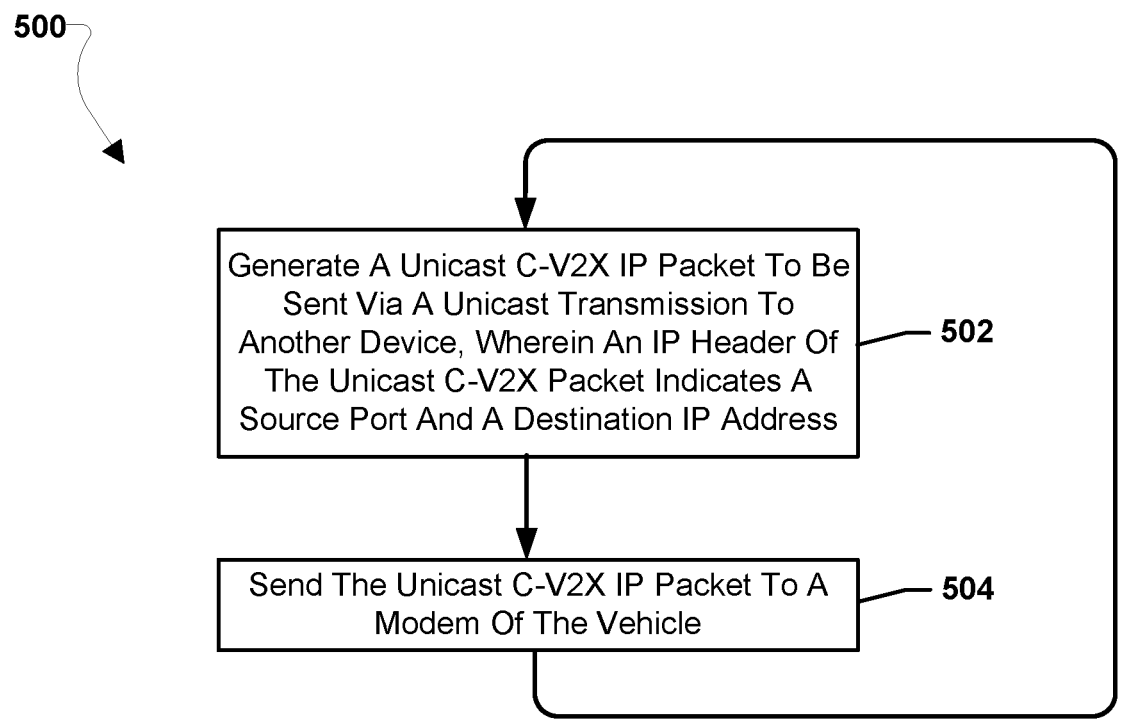
FIGS. 5A and 5B are process flow diagrams illustrating methods for unicast transmission of C-V2X Internet Protocol (IP) packets according to various embodiments.
Figure 5B:
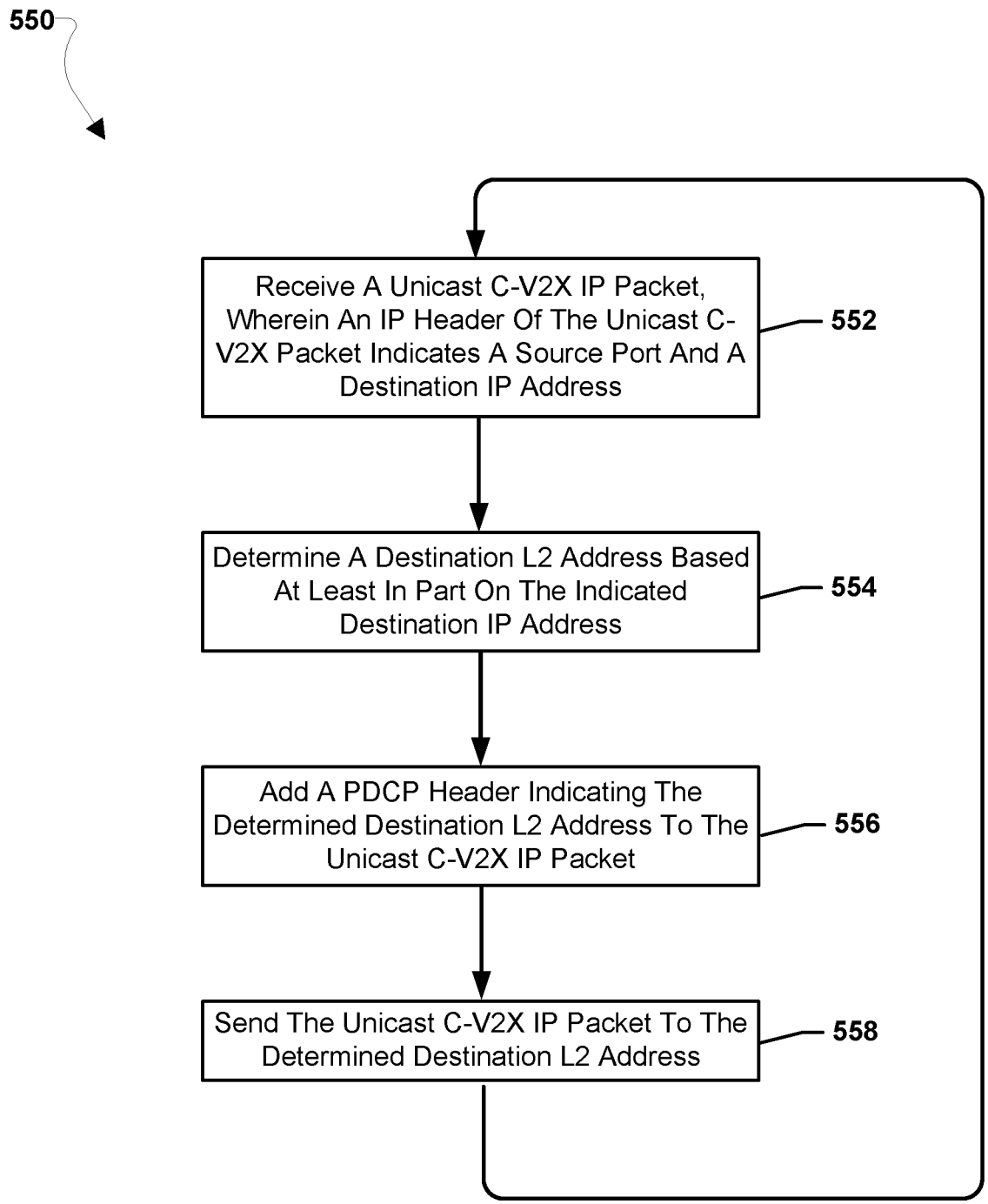

FIGS. 5A and 5B are process flow diagrams illustrating methods for unicast transmission of C-V2X IP packets according to various embodiments. The operations of the methods illustrated in FIGS. 5A and 5B are intended to be illustrative. In some embodiments, the methods may be accomplished with one or more additional operations not described, and/or without one or more of the operations discussed. Additionally, the order in which the operations of the methods are illustrated in 5A and 5B and described is not intended to be limiting.

In some embodiments, the embodiment methods illustrated in 5A and 5B may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods illustrated in FIGS. 5A and 5B in response to instructions stored electronically on an electronic storage medium. The one or more processing devices may include one or more devices configured through hardware, firmware, and/or software to be specifically designed for execution of one or more of the operations of the methods as illustrated in 5A and 5B. For example, with reference to FIGS. 1A-5B, the operations of the methods illustrated in FIGS. 5A and 5B may be performed by one or more processors of a communication device (e.g., in-vehicle communication device 140, 152, 153, RSUs 158, 159, communication device 155, SIP 300, communication devices 401, 415, etc.) implementing various embodiments. As a specific example, the operations of the method 500 (FIG. 5A) may be performed by an AP (e.g., AP 316) of a vehicle running higher data layers (e.g., 402) and the operations of method 550 (FIG. 5B) may be performed by a modem (e.g., modem processor 312, modem processor 352, modem processor 372) of the vehicle running the modem stack (e.g., 406). While the methods illustrated in FIGS. 5A and 5B are discussed with reference to an example of an AP and a modem, the AP and modem are merely one example implementation and are not intended to limit the scope of the various embodiments.

Referring to the method 500 illustrated in FIG. 5A, in block 502, a processor (e.g., a AP processor (e.g., AP 316)) of a vehicle may perform operations to generate a unicast C-V2X IP packet to be sent via a unicast transmission to another device, wherein an IP header of the unicast C-V2X packet indicates a source port and a destination IP address. As an example, the unicast C-V2X IP packet may be a TCP packet. As another example, the unicast C-V2X IP packet may be a UDP packet. The source port and the destination IP address may be the source port and the destination IP address of the other device that is the destination of the unicast C-V2X packet.

In block 504, the processor may perform operations to send the unicast C-V2X IP packet to a modem of the vehicle. For example, the processor may send the unicast C-V2X IP packet via a physical interconnect/bus to the modem.

Referring to FIG. 5B, in block 552 of the method 550, the modem (e.g., modem processor 312, modem processor 352, modem processor 372) may perform operations to receive a unicast C-V2X IP packet, wherein an IP header of the unicast C-V2X IP packet indicates a source port and a destination IP address. As an example, the unicast C-V2X IP packet may be a TCP packet. As another example, the unicast C-V2X IP packet may be a UDP packet. The source port and the destination IP address may be the source port and the destination IP address of the other device that is the destination of the unicast C-V2X packet.

In block 554, the modem may perform operations to determine a destination L2 address based at least in part on the indicated destination IP address. For example, the destination L2 address may be a MAC address of the other device that is the destination of the unicast C-V2X packet. In some embodiments, source port and destination IP address pairings may be associated with destination L2 addresses. In some embodiments, as part of flow negotiation operations the association between source port and destination IP address for a respective destination L2 address may be indicated to the modem. For example, a higher layer (e.g., a layer 3 application and/or stack, such as an ITS stack, telemetry application, API, etc.) may indicate the association between source port and destination IP address for a respective destination L2 address as part of flow negotiation with the modem. The modem may store the association between source port and destination IP address for a respective destination L2 address. For example, the modem may cache associations for each flow and/or may store address mapping tables associating destination IP addresses and destination L2 addresses. In some embodiments, the modem may determine the destination address based at least in part on the indicated destination IP address by matching the indicated destination IP address and/or the indicated destination IP address and indicated source port to a stored destination IP address and/or a stored destination IP address and source port associated with a destination L2 address.

In block 556, the modem may perform operations to add a PDCP header indicating the determined destination L2 address to the unicast C-V2X IP packet. For example, the modem may prepend a PDCP header including an indication of the determined destination L2 address to the unicast C-V2X IP packet. Adding the PDCP header to the unicast C-V2X IP packet, alone or in conjunction with other operations, may convert the unicast C-V2X IP packet to a PDCP packet.

In block 558, the modem may perform operations to send the unicast C-V2X IP packet to the determined destination L2 address. For example, the unicast C-V2X IP packet with the added PDCP header indicating the destination L2 address may be sent to lower layers (e.g., RLC layer, MAC layer, PHY layer, etc.) of the modem stack and to the destination (e.g., the other device) via over the air unicast transmission (e.g., unicast transmission via the PC5 interface, Uu interface, etc.).

Figure 6A:
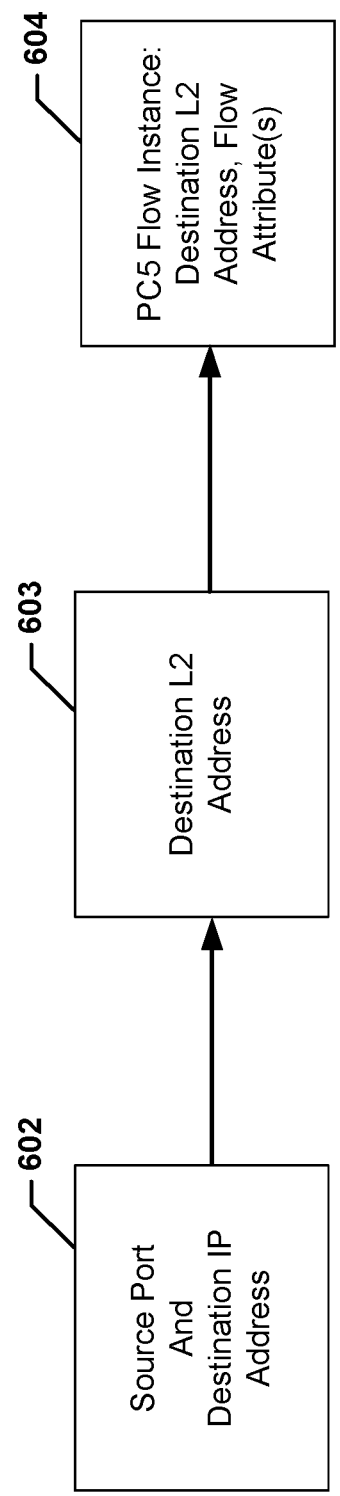
FIG. 6A illustrates example associations for a unicast C-V2X IP packet flow according to various embodiments.

FIG. 6A illustrates example associations for a unicast C-V2X IP packet flow according to various embodiments. With reference to FIGS. 1A-6A, FIG. 6A illustrates that in various embodiments a source port and destination IP address pairing 602 may be associated with a destination L2 address 603 (e.g., a MAC address). The destination L2 address 603 may be associated with a flow instance 604 (e.g., a PC5 flow instance) for the destination L2 address which may include one or more flow attributes for the PC5 flow, such as a periodicity, an SPS sidelink identifier, a priority, a PDB, a transmit power, etc. In various embodiments, the associations between the source port and destination IP address pairing 602, the destination L2 address 603, and the flow instance 604 may be determined by a higher layer (e.g., a layer 3 application and/or stack, such as an ITS stack, telemetry application, API, etc.) and indicated to a modem (e.g., an upper layer of the modem stack (e.g., a PDCP layer)) in flow registrations and/or destination address registrations.

Figure 6B:
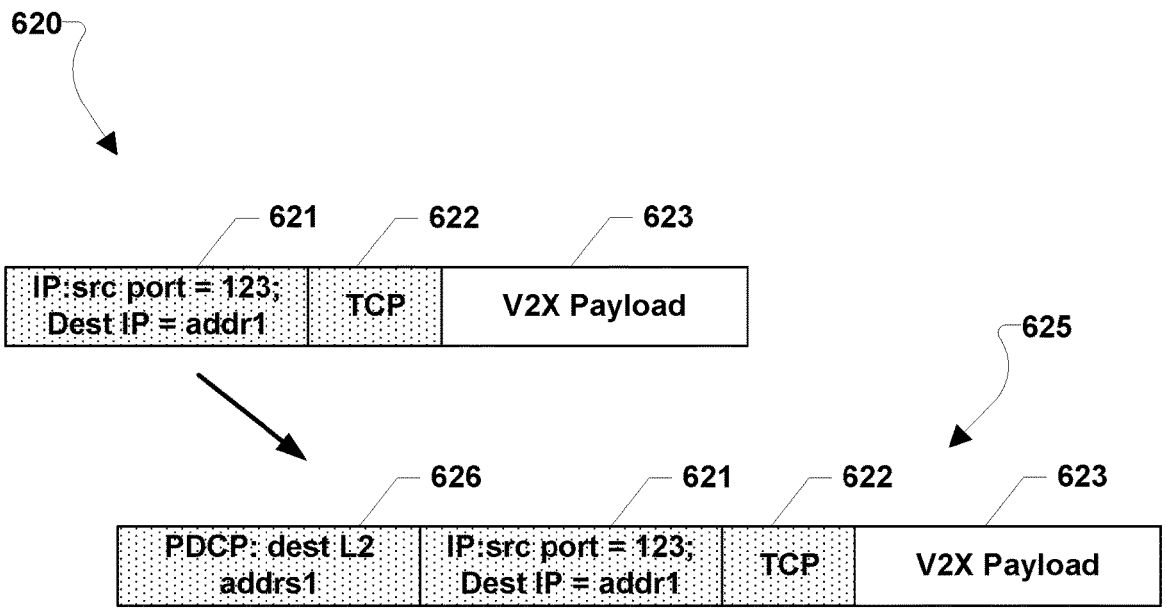
FIG. 6B illustrates an example of adding a Packet Data Convergence Protocol (PDCP) header to a transmission control protocol (TCP) packet according to various embodiments.

FIG. 6B illustrates an example of adding a PDCP header 626 to a TCP packet 620 according to various embodiments. With reference to FIGS. 1A-6B, the TCP packet 620 may be generated according to the operations of method 500 (FIG. 5A). The TCP packet 620 may be an example of a unicast C-V2X IP packet. The TCP packet 620 may include an IP header 621, a TCP header 622, and a V2X payload 623. The IP header 621 may include an indication of a source port for the destination of the TCP packet 620. For example, the source port indication may be "src port=123" as indicated in FIG. 6B. The IP header 621 may include an indication of a destination IP address for the destination of the TCP packet 620. For example, the destination IP address indication may be "Dest IP=addr1" as indicated in FIG. 6B where addr1 is the IP address of the destination. The TCP packet 620 may be received by a modem and the PDCP header 626 may be added thereby converting the TCP packet 620 into a PDCP packet 625. For example, the modem may perform operations of method 550 (FIG. 5B) to add the PDCP header 626. The PDCP header 626 may include the destination L2 address (e.g., the MAC address) of the destination of the TCP packet 620. For example, the destination L2 address indication may be "dest L2 addrs1" as indicated in FIG. 6B where addrs1 is the destination L2 address.

Figure 6C:
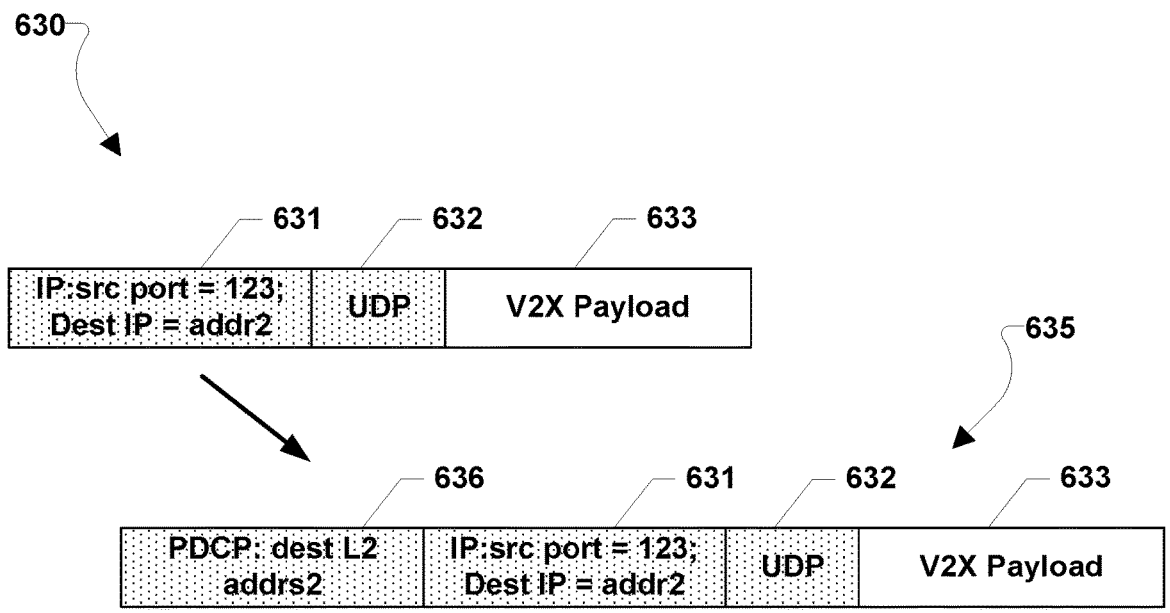
FIG. 6C illustrates an example of adding a PDCP header to a user datagram protocol (UDP) packet according to various embodiments.

FIG. 6C illustrates an example of adding a PDCP header 636 to a UDP packet 630 according to various embodiments. With reference to FIGS. 1A-6C, the UDP packet 630 may be generated according to the operations of method 500 (FIG. 5A). The UDP packet 630 may be an example of a unicast C-V2X IP packet. The UDP packet 630 may include an IP header 631, a UDP header 632, and a V2X payload 633. The IP header 631 may include an indication of a source port for the destination of the UDP packet 630. For example, the source port indication may be "src port=123" as indicated in FIG. 6C. The IP header 631 may include an indication of a destination IP address for the destination of the UDP packet 630. For example, the destination IP address indication may be "Dest IP=addr2" as indicated in FIG. 6C where addr2 is the IP address of the destination. As can be seen by comparing the TCP packet 620 of FIG. 6B and the UDP packet 630 of FIG. 6C, two different unicast C-V2X packets may have the same source port, e.g., source port 123, but may have different destination IP addresses, e.g., addr1 and addr2.

The UDP packet 630 may be received by a modem and the PDCP header 636 may be added thereby converting the UDP packet 630 into a PDCP packet 635. For example, the modem may perform operations of the method 550 (FIG. 5B) to add the PDCP header 636. The PDCP header 636 may include the destination L2 address (e.g., the MAC address) of the destination of the UDP packet 630. For example, the destination L2 address indication may be "dest L2 addrs2" as indicated in FIG. 6C where addrs2 is the destination L2 address. As can be seen by comparing the TCP packet 620 of FIG. 6B and the UDP packet 630 of FIG. 6C, while the source ports may be the same (e.g., source port 123), the different destination IP addresses (e.g., addr1 and addr2) may enable the different PDCP packets 625, 635 to be addressed to different destination L2 addresses, e.g., addrs1 and addrs2.

Figure 7A:
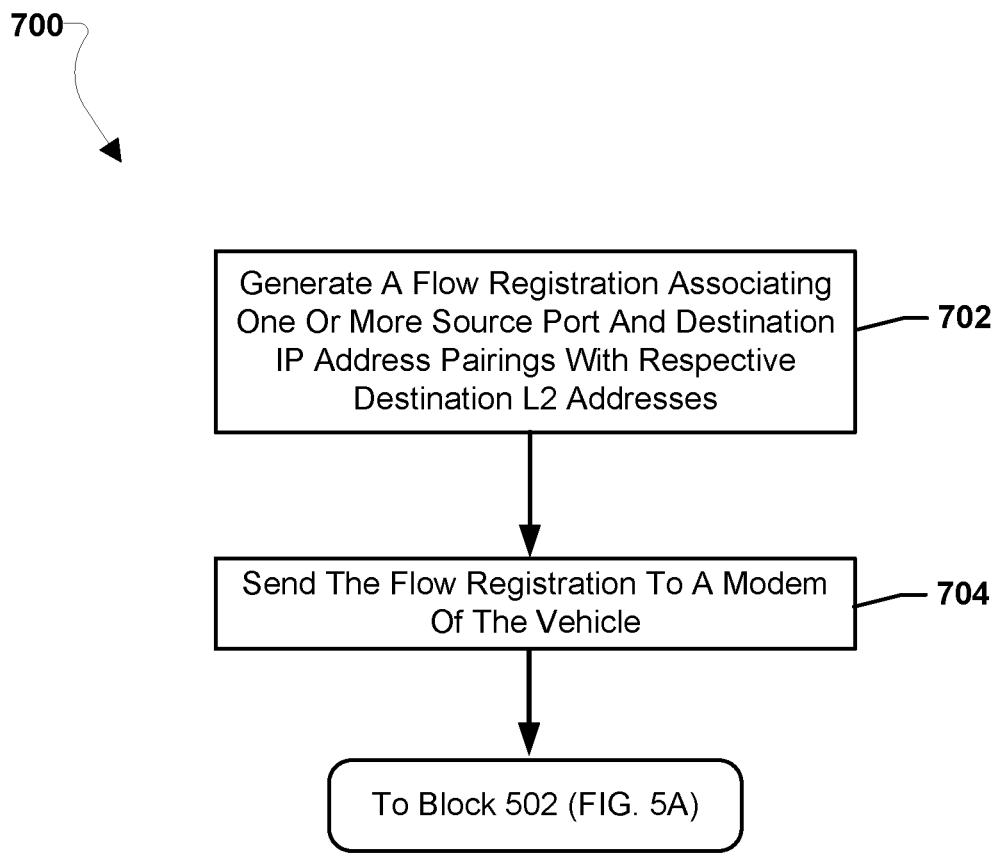
FIGS. 7A and 7B are process flow diagrams illustrating methods for unicast transmission of C-V2X IP packets according to various embodiments.
Figure 7B:
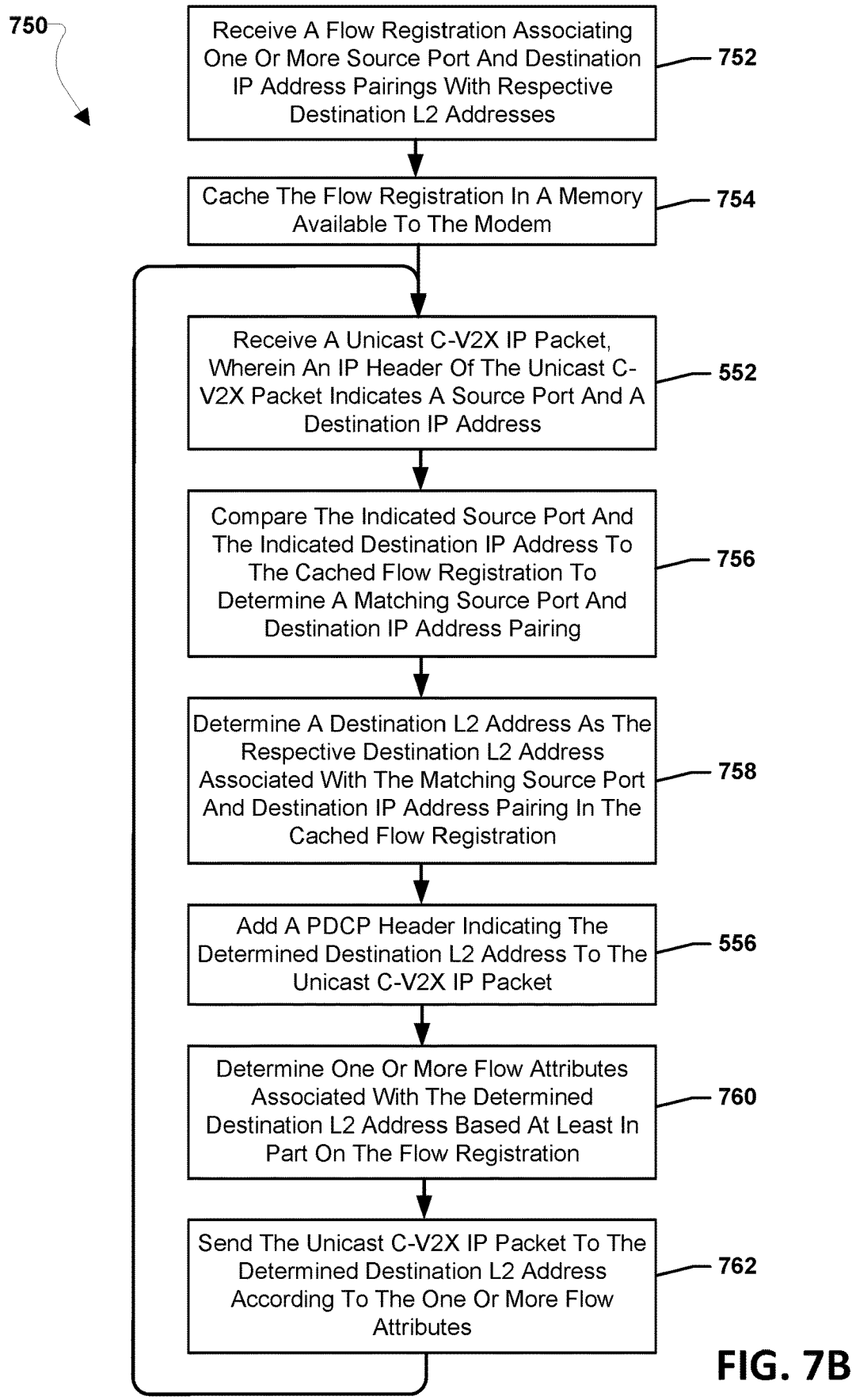

FIGS. 7A and 7B are process flow diagrams illustrating methods for unicast transmission of C-V2X IP packets according to various embodiments. The operations of the methods illustrated in FIGS. 7A and 7B are intended to be illustrative. In some embodiments, methods may be accomplished with one or more additional operations not described, and/or without one or more of the operations discussed. Additionally, the order in which the operations of methods as illustrated in 7A and 7B and described is not intended to be limiting.

In some embodiments, the methods illustrated in 7A and 7B may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods illustrated in FIGS. 7A and 7B in response to instructions stored electronically on an electronic storage medium. The one or more processing devices may include one or more devices configured through hardware, firmware, and/or software to be specifically designed for execution of one or more of the operations of the methods illustrated in 7A and 7B. For example, with reference to FIGS. 1A-7B, the operations of the methods illustrated in FIGS. 7A and 7B may be performed by one or more processors of a communication device (e.g., in-vehicle communication device 140, 152, 153, RSUs 158, 159, communication device 155, SIP 300, communication devices 401, 415, etc.) implementing various embodiments. As a specific example, the operations of the method 700 (FIG. 7A) may be performed by an AP (e.g., AP 316) of a vehicle running higher data layers (e.g., 402) and the operations of method 750 (FIG. 7B) may be performed by a modem (e.g., modem processor 312, modem processor 352, modem processor 372) of the vehicle running the modem stack (e.g., 406). While the methods illustrated in FIGS. 7A and 7B are discussed with reference to an example of an AP and a modem, the AP and modem are merely one example implementation and are not intended to limit the scope of the various embodiments. In some embodiments, the operations of methods 700 (FIG. 7A) and/or 750 (FIG. 7B) may be performed in conjunction with the operations of methods 500 (FIG. 5A) and/or 550 (FIG. 5B). For example, in various embodiments, the operations of the method 750 (FIG. 7B) may be performed at least in part to determine the destination L2 address based at least in part on the indicated destination IP address.

Referring to FIG. 7A, in block 702 of the method 700, a processor (e.g., an AP processor (e.g., AP 316)) of a vehicle may perform operations to generate a flow registration associating one or more source port and destination IP address pairings with respective destination L2 addresses. In various embodiments, a higher layer (e.g., a layer 3 application and/or stack, such as an ITS stack, telemetry application, API, etc.) may negotiate flow registrations with a modem (e.g., an upper layer of the modem stack (e.g., a PDCP layer)). Flow registrations may define one or more flow attributes to be used for the transmission of the unicast C-V2X IP packets on a flow, such as a periodicity, an SPS sidelink identifier, a priority, a PDB, a transmit power, etc. Flow registrations may associate one or more source and destination IP address pairings with respective destination L2 addresses. In some embodiments, flow registrations may be negotiated for each unicast destination.

In block 704, the processor may perform operations to send the flow registration to the modem of the vehicle. For example, the processor may send the flow registration via a physical interconnect/bus to the modem.

In some embodiments, in response to sending the flow registration, the processor may perform operations of block 502 of method 500 (FIG. 5A) to generate a unicast C-V2X IP packet to be sent via a unicast transmission to another device.

Referring to FIG. 7B, in block 752 of the method 750, the modem (e.g., modem processor 312, modem processor 352, modem processor 372) may perform operations to receive a flow registration associating one or more source port and destination IP address pairings with respective destination L2 addresses. For example, the modem may receive the flow registration via a physical interconnect/bus to a processor (e.g., AP processor 316).

In block 754, the modem may perform operations to cache the flow registration in a memory available to the modem. In various embodiments, a modem may cache flow registrations for use in determining destination L2 addresses for received unicast C-V2X IP packets and/or for determining flow attributes for received unicast C-V2X IP packets.

In block 552, the modem may perform operations as discussed with reference to like numbered block of method 550 (FIG. 5B) to receive a unicast C-V2X IP packet, wherein an IP header of the unicast C-V2X IP packet indicates a source port and a destination IP address.

In block 756, the modem may perform operations to compare the indicated source port and the indicated destination IP address to the cached flow registration to determine a matching source port and destination IP address pairing. For example, the modem may parse the cached flow registrations and compare the source port and destination IP address pairings in the flow registrations to the indicated source port and the indicated destination IP address to determine a matching source port and destination IP address pairing.

In block 758, the modem may perform operations to determine a destination L2 address as the respective destination L2 address associated with the matching source port and destination IP address pairing in the cached flow registration. In some embodiments, as each flow registration that is cached includes a respective destination L2 address associated with a source port and destination IP address pairing, a match between the source port and destination IP address pairing in the cached flow registration and the indicated source port and the indicated destination IP address in the IP header of the unicast C-V2X IP packet may indicate the respective destination L2 address of the matching source port and destination IP address pairing is the destination L2 address of the destination for the unicast C-V2X IP packet.

In block 556, the modem may perform operations as described with reference to like numbered block of the method 550 (FIG. 5B) to add a PDCP header indicating the determined destination L2 address to the unicast C-V2X IP packet.

In block 760, the modem may perform operations to determine one or more flow attributes associated with the determined destination L2 address based at least in part on the flow registration. The cached flow registration may define one or more flow attributes to be used for the transmission of the unicast C-V2X IP packets on a flow, such as a periodicity, an SPS sidelink identifier, a priority, a PDB, a transmit power, etc.

In block 762, the modem may perform operations to send the unicast C-V2X IP packet to the determined destination L2 address according to the determined one or more flow attributes. For example, the unicast C-V2X IP packet may be sent with the periodicity, the SPS sidelink identifier, the priority, the PDB, and/or the transmit power indicated in the flow attributes for the flow associated with the determined destination L2 address.

Figure 8:
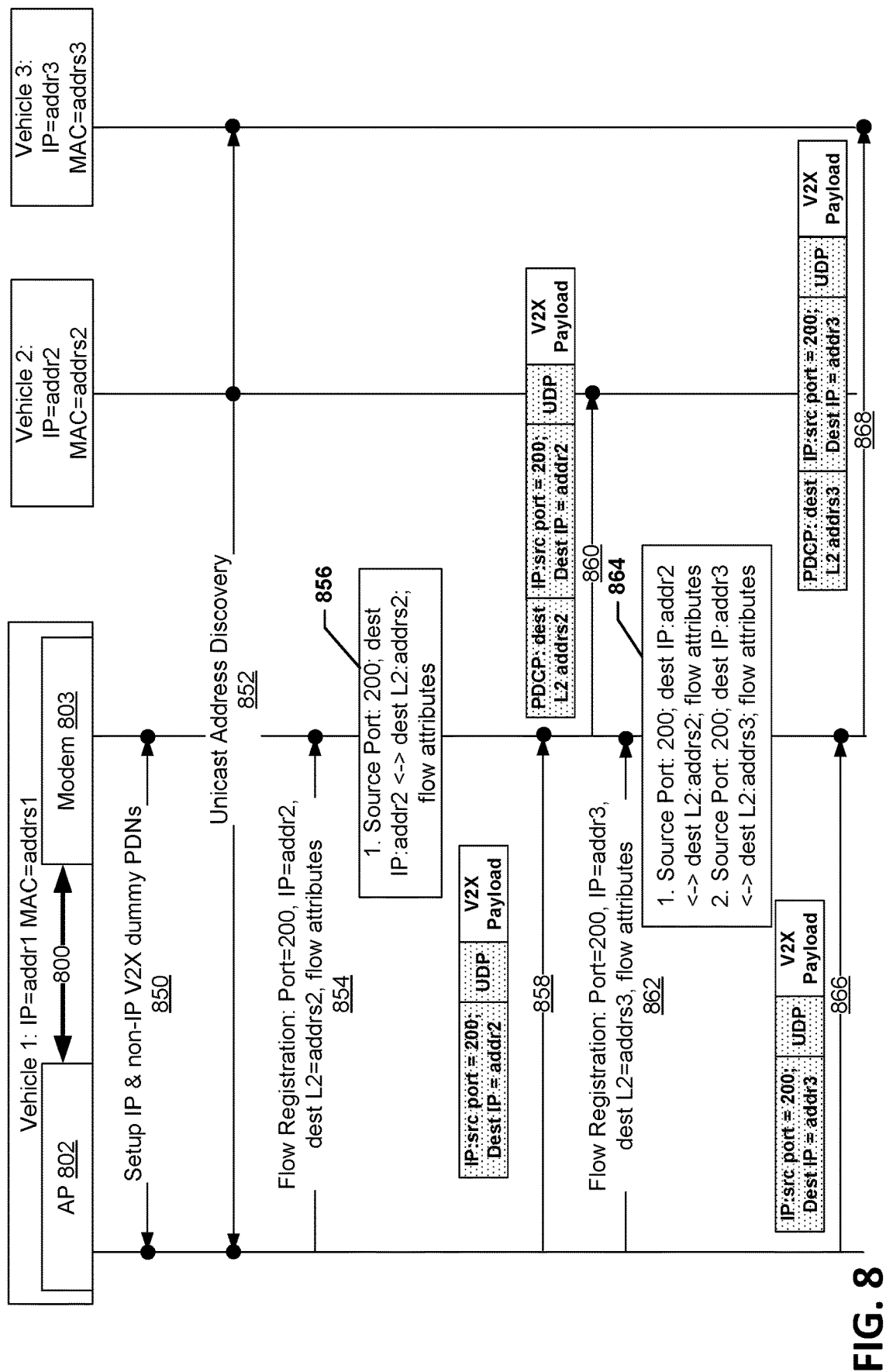
FIG. 8 is a call flow diagram illustrating example interactions between vehicles to send unicast C-V2X IP packets according to various embodiments.

FIG. 8 is a call flow diagram illustrating example interactions between vehicles, such as Vehicle 1, Vehicle 2, and Vehicle 3, to send unicast C-V2X IP packets, such as UDP packets, TCP packets, etc., according to various embodiments. With reference to FIGS. 1A-8, the call flow diagram of FIG. 8 illustrates Vehicle 1 sending unicast C-V2X IP packets to Vehicle 2 and Vehicle 3. While illustrated as UDP packets in FIG. 8, the UDP packets are merely one example of unicast C-V2X IP packets, and may be substituted with other types of unicast C-V2X IP packets, such as TCP packets. The Vehicles 1, 2, 3, may be specific examples of communication devices (e.g., in-vehicle communication device 140, 152, 153, RSUs 158, 159, communication device 155, SIP 300, communication devices 401, 415, etc.) implementing various embodiments. As illustrated in FIG. 8, the Vehicle 1 may include an AP 802 (e.g., AP 316) connected to a modem 803 (e.g., modem 312, 352, 372) by a physical interconnect or bus 800 (e.g., 326, 350, 364, 384). As an example, the interactions illustrated in FIG. 8 may be operations performed by the AP 802 and/or modem 803 according to one or more operations of the methods 500 (FIG. 5A), 550 (FIG. 5B), 700 (FIG. 7A), and/or 750 (FIG. 7B).

Vehicle 1 may have its own respective IP address (e.g., addr1) and destination L2 address (e.g., addrs1), such as a MAC address. Vehicle 2 may have its own respective IP address (e.g., addr2) and destination L2 address (e.g., addrs2), such as a MAC address. Vehicle 3 may have its own respective IP address (e.g., addr3) and destination L2 address (e.g., addrs3), such as a MAC address.

In operation 850, the modem 803 and AP 802 of Vehicle 1 may setup IP and non-IP V2X dummy packet data networks (PDNs). In operation 852, the AP 802 of Vehicle 1 may perform unicast address discovery operations to identify the IP addresses and destination L2 addresses of Vehicles 2 and 3.

In operation 854, the AP 802 of Vehicle 1 may generate and send a flow registration for a first flow for unicast transmissions to Vehicle 2. The flow registration for unicast transmission to Vehicle 2 may indicate a source port of 200, an IP address of addr2, a destination L2 address of addrs2, and flow attributes for the unicast flow to use of unicast transmissions to Vehicle 2. The indication of the source port of 200, the IP address of addr2, the destination L2 address of addrs2, and the flow attributes in the same flow registration may indicate to the modem 803 that the source port 200 and IP address addr2 pairing is associated with the destination L2 address (addrs2) of Vehicle 2. The modem 803 may receive the flow registration and cache the flow registration in operation 856.

In operation 858, the AP 802 may send a unicast C-V2X packet destined for Vehicle 2 to the modem 803. The unicast C-V2X packet destined for Vehicle 2 may indicate the source port 200 and destination IP address addr2 in an IP header. The modem 803 may receive the unicast C-V2X packet and in operation 860 may determine the destination L2 address of Vehicle 2 is associated with the source port 200 and destination IP address addr2 pair in the unicast C-V2X packet based on the cached flow registration. The modem 803 may add a PDCP header to the unicast C-V2X packet indicating the destination L2 address of Vehicle 2 and send the unicast C-V2X packet to Vehicle 2.

In operation 862, the AP 802 of Vehicle 1 may generate and send a flow registration for a second flow for unicast transmissions to Vehicle 3. The flow registration for unicast transmission to Vehicle 3 may indicate a source port of 200, an IP address of addr3, a destination L2 address of addrs3, and flow attributes for the unicast flow to use of unicast transmissions to Vehicle 3. The indication of the source port of 200, the IP address of addr3, the destination L2 address of addrs3, and the flow attributes in the same flow registration may indicate to the modem 803 that the source port 200 and IP address addr3 pairing is associated with the destination L2 address (addrs3) of Vehicle 3. The modem 803 may receive the flow registration and cache the flow registration in operation 864. As illustrated in FIG. 8, the cached flow registrations may include the flow registration for the first flow to Vehicle 2 and the flow registration for the second flow to Vehicle 3. The cached flow registrations may enable the modem 803 to differentiation destinations (e.g., Vehicle 2 vs Vehicle 3) for unicast C-V2X IP packets.

In operation 866, the AP 802 may send a unicast C-V2X packet destined for Vehicle 3 to the modem 803. The unicast C-V2X packet destined for Vehicle 3 may indicate the source port 200 and destination IP address addr3 in an IP header. The modem 803 may receive the unicast C-V2X packet and in operation 868 may determine the destination L2 address of Vehicle 3 is associated with the source port 200 and destination IP address addr3 pair in the unicast C-V2X packet based on the cached flow registrations. The modem 803 may add a PDCP header to the unicast C-V2X packet indicating the destination L2 address of Vehicle 3 and send the unicast C-V2X packet to Vehicle 3.

Figure 9A:
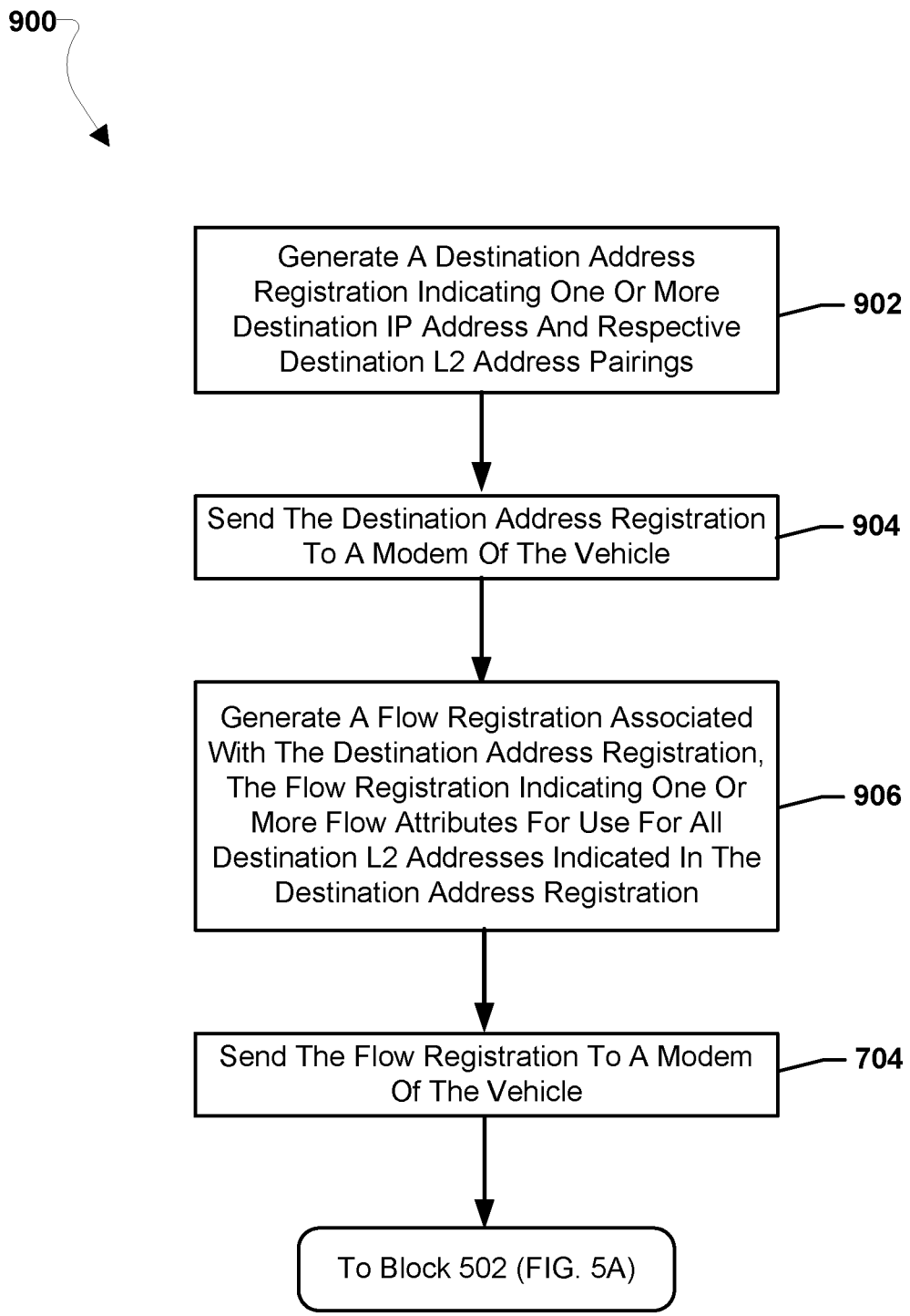
FIGS. 9A and 9B are process flow diagrams illustrating methods for unicast transmission of C-V2X IP packets according to various embodiments.
Figure 9B:
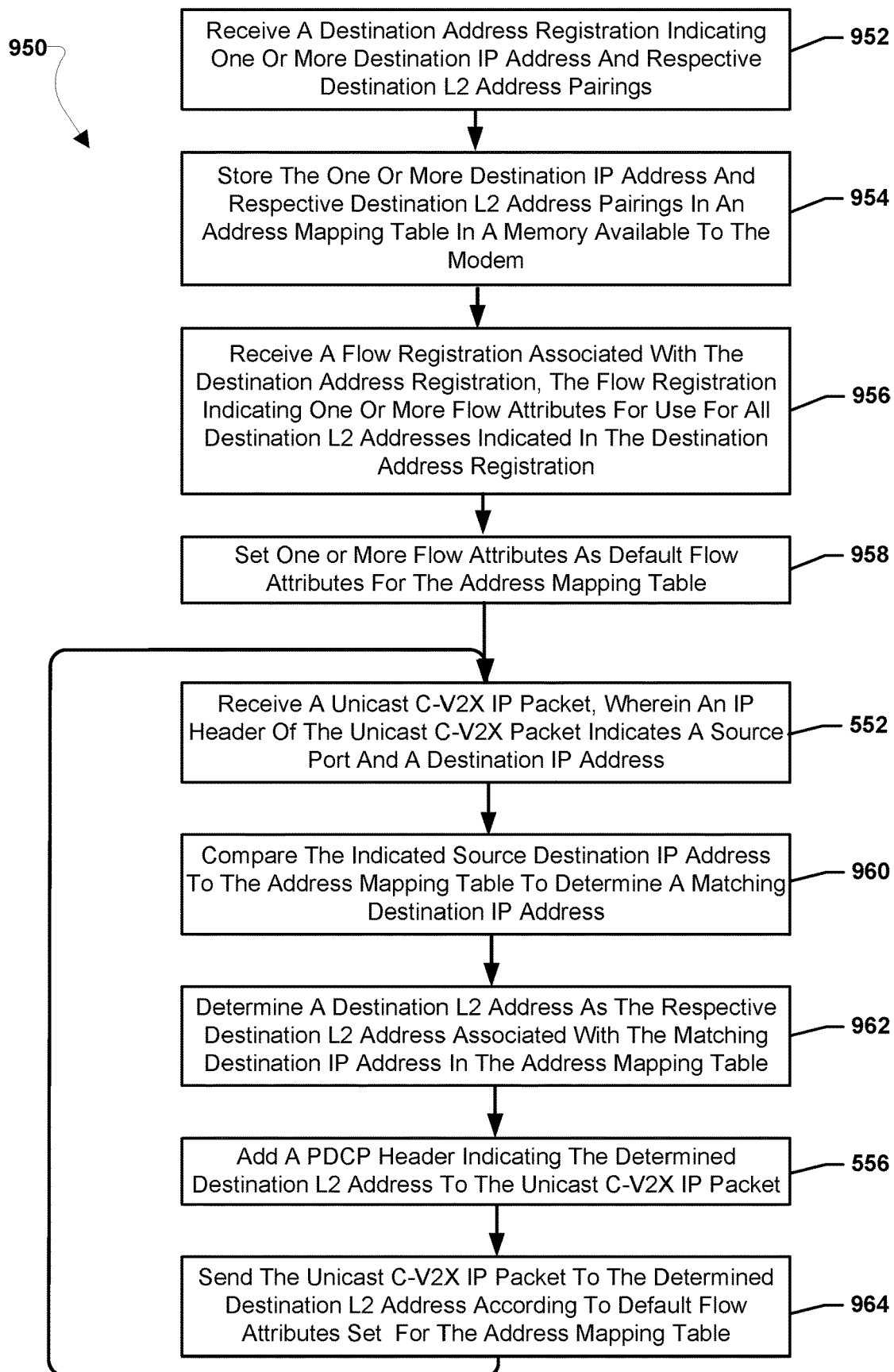

FIGS. 9A and 9B are process flow diagrams illustrating methods for unicast transmission of C-V2X IP packets according to various embodiments. The operations of the methods illustrated in FIGS. 9A and 9B are intended to be illustrative. In some embodiments, the methods may be accomplished with one or more additional operations not described, and/or without one or more of the operations discussed. Additionally, the order in which the operations of the methods are illustrated in 9A and 9B and described is not intended to be limiting.

In some embodiments, the methods illustrated in 9A and 9B may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods illustrated in FIGS. 9A and 9B in response to instructions stored electronically on an electronic storage medium. The one or more processing devices may include one or more devices configured through hardware, firmware, and/or software to be specifically designed for execution of one or more of the operations of the methods as illustrated in 9A and 9B. For example, with reference to FIGS. 1A-9B, the operations of the methods illustrated in FIGS. 9A and 9B may be performed by one or more processors of a communication device (e.g., in-vehicle communication device 140, 152, 153, RSUs 158, 159, communication device 155, SIP 300, communication devices 401, 415, etc.) implementing various embodiments. As a specific example, the operations of the method 900 (FIG. 9A) may be performed by an AP (e.g., AP 316) of a vehicle running higher data layers (e.g., 402) and the operations of method 950 (FIG. 9B) may be performed by a modem (e.g., modem processor 312, modem processor 352, modem processor 372) of the vehicle running the modem stack (e.g., 406). While the methods illustrated in FIGS. 9A and 9B are discussed with reference to an example of an AP and a modem, the AP and modem are merely one example implementation and are not intended to limit the scope of the various embodiments. In some embodiments, the operations of the methods 900 (FIG. 9A) and/or 950 (FIG. 9B) may be performed in conjunction with the operations of methods 500 (FIG. 5A) and/or 550 (FIG. 5B). For example, in various embodiments, the operations of method 950 (FIG. 9B) may be performed at least in part to determine the destination L2 address based at least in part on the indicated destination IP address.

Referring to FIG. 9A, in block 902 of the method 900, a processor (e.g., an AP processor (e.g., AP 316)) of a vehicle may perform operations to generate a destination address registration indicating one or more destination IP address and respective destination L2 address pairings. In some embodiments, flow attributes may apply to all destination L2 addresses associated with the same source port. For example, all flows on the same source port may have the same priority and same transmit power. The only difference between the flows may be the destination L2 addresses. In some embodiments, a higher layer (e.g., a layer 3 application and/or stack, such as an ITS stack, telemetry application, API, etc.) may generate a destination address registration indicating destination IP address and destination L2 address pairings. For example, the destination address registration may indicate all destination IP addresses paired with their respective destination L2 addresses as discovered during unicast address discovery operations.

In block 904, the processor may perform operations to send the destination address registration to the modem of the vehicle. For example, the processor may send the destination address registration via a physical interconnect/bus to the modem.

In block 906, the processor may perform operations to generate a flow registration associated with the destination address registration, the flow registration indicating one or more flow attributes to use for all destination L2 addresses indicated in the destination address registration. In some embodiments, a higher layer (e.g., a layer 3 application and/or stack, such as an ITS stack, telemetry application, API, etc.) may negotiate a single default flow registration with a modem (e.g., an upper layer of the modem stack (e.g., a PDCP layer)) for flows to all destination L2 addresses associated with the same source port. In some embodiments, a higher layer (e.g., a layer 3 application and/or stack, such as an ITS stack, telemetry application, API, etc.) may generate a flow registration associated with the destination address registration. The flow registration may indicate one or more flow attributes to use for all destination L2 addresses in the destination address registration.

In block 704, the processor may perform operations as discussed with reference to like numbered block of the method 700 (FIG. 7A) to send the flow registration to the modem of the vehicle. In some embodiments, in response to sending the flow registration, the processor may perform operations of block 502 of method 500 (FIG. 5A) to generate a unicast C-V2X IP packet to be sent via a unicast transmission to another device.

Referring to FIG. 9B, in block 952 of the method 950, the modem (e.g., modem processor 312, modem processor 352, modem processor 372) may perform operations to receive a destination address registration indicating one or more destination IP address and respective destination L2 address pairings. In various embodiments, the destination address registration may indicate pairings of all destination L2 addresses and their corresponding destination IP addresses for all destinations discovered during unicast address discovery operations.

In block 954, the modem may perform operations to store the one or more destination IP address and respective destination L2 address pairings in an address mapping table in a memory available to the modem. The address mapping table may be a table stored in a memory location available to the modem correlating destination IP addresses and their respective destination L2 addresses for each destination discovered during unicast address discovery operations.

In block 956, the modem may perform operations to receive a flow registration associated with the destination address registration, the flow registration indicating one or more flow attributes to use for all respective destination L2 addresses in the destination address registration. In various embodiments, the flow registration may be associated with the destination address registration and/or the destinations indicated in the address mapping table.

In block 958, the modem may perform operations to set the one or more flow attributes as default flow attributes for the address mapping table. For example, the modem may set the flow attributes in the flow registration as the default flow attributes, such as default periodicity, default SPS sidelink identifier, default priority, default PDB, default transmit power, etc., to be used for the transmission of the unicast C-V2X IP packets to any destination L2 address indicated in the address mapping table.

In block 552, the modem may perform operations as described with reference to like numbered block of the method 550 (FIG. 5B) to receive a unicast C-V2X IP packet, wherein an IP header of the unicast C-V2X IP packet indicates a source port and a destination IP address.

In block 960, the modem may perform operations to compare the indicated destination IP address to the address mapping table to determine a matching destination IP address. For example, the modem may parse the stored address mapping table and compare the destination IP addresses in the address mapping table to the indicated destination IP address to determine a matching destination IP address.

In block 962, the modem may perform operations to determine a destination L2 address as the respective destination L2 address associated with the matching destination IP address in the address mapping table. In various embodiments, as the address mapping table includes a respective destination L2 address associated with each destination IP address, a match between the destination IP address in the address mapping table and the indicated destination IP address in the IP header of the unicast C-V2X IP packet may indicate the respective destination L2 address of the matching destination IP address is the destination L2 address of the destination for the unicast C-V2X IP packet.

In block 556, the modem may perform operations as discussed with reference to like numbered block of the method 550 (FIG. 5B) to add a PDCP header indicating the determined destination L2 address to the unicast C-V2X IP packet.

In block 964, the modem may perform operations to send the unicast C-V2X IP packet to the determined destination L2 address according to the default flow attributes set for the address mapping table. For example, the unicast C-V2X IP packet may be sent with the default periodicity, the default SPS sidelink identifier, the default priority, the default PDB, and/or the default transmit power indicated in the default flow attributed associated with the address mapping table.

Figure 10:
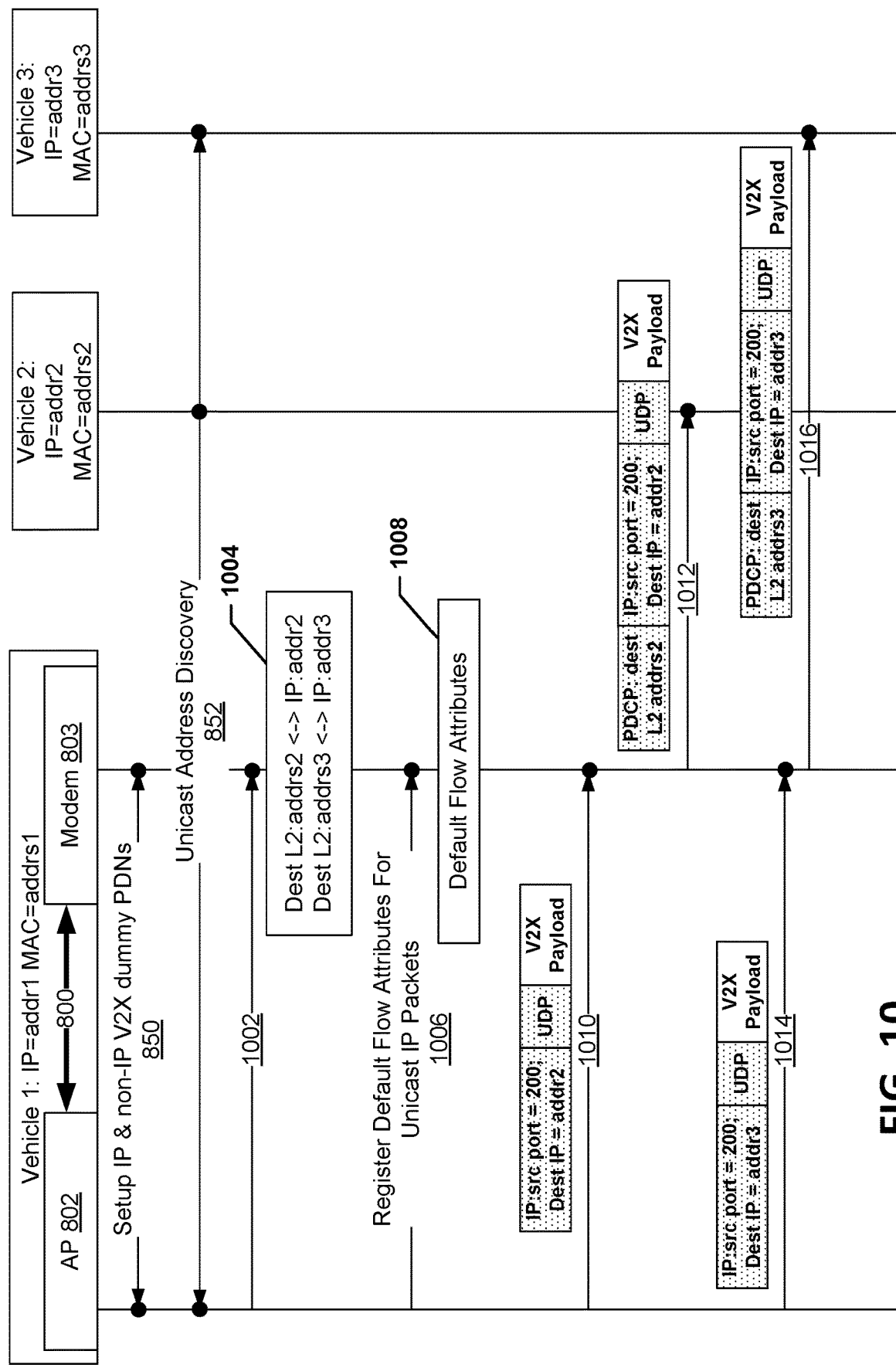
FIG. 10 is a call flow diagram illustrating example interactions between vehicles to send unicast C-V2X IP packets according to various embodiments.

FIG. 10 is a call flow diagram illustrating example interactions between vehicles, such as Vehicle 1, Vehicle 2, and Vehicle 3, to send unicast C-V2X IP packets, such as UDP packets, TCP packets, etc., according to various embodiments. With reference to FIGS. 1A-10, the call flow diagram of FIG. 10 illustrates Vehicle 1 sending unicast C-V2X IP packets to Vehicle 2 and Vehicle 3. While illustrated as UDP packets in FIG. 10, the UDP packets are merely one example of unicast C-V2X IP packets, and may be substituted with other types of unicast C-V2X IP packets, such as TCP packets. The Vehicles 1, 2, 3, may be specific examples of communication devices (e.g., in-vehicle communication device 140, 152, 153, RSUs 158, 159, communication device 155, SIP 300, communication devices 401, 415, etc.) implementing various embodiments. As illustrated in FIG. 10, the Vehicle 1 may include an AP 802 (e.g., AP 316) connected to a modem 803 (e.g., modem 312, 352, 372) by a physical interconnect or bus 800 (e.g., 326, 350, 364, 384). As an example, the interactions illustrated in FIG. 10 may be operations performed by the AP 802 and/or modem 803 according to one or more operations of the methods 500 (FIG. 5A), 550 (FIG. 5B), 900 (FIG. 9A), and/or 950 (FIG. 9B).

Vehicle 1 may have its own respective IP address (e.g., addr1) and destination L2 address (e.g., addrs1), such as a MAC address. Vehicle 2 may have its own respective IP address (e.g., addr2) and destination L2 address (e.g., addrs2), such as a MAC address. Vehicle 3 may have its own respective IP address (e.g., addr3) and destination L2 address (e.g., addrs3), such as a MAC address.

In operation 850, the modem 803 and AP 802 of Vehicle 1 may setup IP and non-IP V2X dummy packet data networks (PDNs). In operation 852, the AP 802 of Vehicle 1 may perform unicast address discovery operations to identify the IP addresses and destination L2 addresses of Vehicles 2 and 3.

In operation 1002, the AP 802 may generate and send a destination address registration to the modem 803. The destination address registration may indicate the destination IP address and destination L2 address pairings of the destination devices, Vehicle 2 and Vehicle 3, identified during unicast address discovery operations 852. The modem 803 may store the destination IP address and destination L2 pairings in an address mapping table 1004.

In operation 1006, the AP 802 may register default flow attributes for unicast IP packets to be sent to any destination L2 address in the destination address registration. The modem 803 may set the one or more flow attributes as default flow attributes for the address mapping table in operation 1008.

In operation 1010, the AP 802 may send a unicast C-V2X packet destined for Vehicle 2 to the modem 803. The unicast C-V2X packet destined for Vehicle 2 may indicate the source port 200 and destination IP address addr2 in an IP header. The modem 803 may receive the unicast C-V2X packet and in operation 1012 may determine the destination L2 address of Vehicle 2 is associated with the source port 200 and destination IP address addr2 pair in the unicast C-V2X packet based on the address mapping table 1004. The modem 803 may add a PDCP header to the unicast C-V2X packet indicating the destination L2 address of Vehicle 2 and send the unicast C-V2X packet to Vehicle 2 using the default flow attributes associated with the address mapping table 1004.

In operation 1014, the AP 802 may send a unicast C-V2X packet destined for Vehicle 3 to the modem 803. The unicast C-V2X packet destined for Vehicle 3 may indicate the source port 200 and destination IP address addr3 in an IP header. The modem 803 may receive the unicast C-V2X packet and in operation 1016 may determine the destination L2 address of Vehicle 3 is associated with the source port 200 and destination IP address addr3 pair in the unicast C-V2X packet based on the stored address mapping table 1004. The modem 803 may add a PDCP header to the unicast C-V2X packet indicating the destination L2 address of Vehicle 3 and send the unicast C-V2X packet to Vehicle 3 using the default flow attributes associated with the address mapping table 1004.

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or Data structures stored thereon. Components may communicate by way of local and/or remote processes, function or procedure calls, electronic signals, Data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, Data, signaling, and/or content Messages. It should be understood that any references to terminology and/or technical details related to an individual telecommunication standard or technology are for illustrative purposes only, and are not intended to limit the scope of the Claims to a particular communication system or technology unless specifically recited in the claim language.

Various aspects illustrated and described are provided merely as examples to illustrate various features of the Claims. However, features shown and described with respect to any given aspect are not necessarily limited to the associated aspect and may be used or combined with other aspects that are shown and described. Further, the Claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the Claims.

The hardware used to implement various illustrative logics, logical blocks, modules, and circuits described in connection with the aspects disclosed herein may be implemented or performed with a general purpose processor, a digital Signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or Data structures and that may be accessed by a computer. Disk and disc, as used herein, includes compact disc (CD), laser disc, optical disc, digital versatile disc (DVD), floppy disk, and Blu-ray disc where disks usually reproduce Data magnetically, while discs reproduce Data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for unicast transmission of cellular vehicle-to-everything (C-V2X) Internet Protocol (IP) packets performed by a modem of a vehicle, comprising:
   receiving a flow registration from a processor of the vehicle associating one or more source port and destination IP address pairings with respective destination layer 2 (L2) addresses, wherein the flow registration associates one or more flow attributes with each respective destination L2 address;
   caching the flow registration in a memory available to the modem of the vehicle,
   receiving a unicast C-V2X IP packet at the modem of the vehicle from the processor of the vehicle, wherein an IP header of the unicast C-V2X IP packet includes indications of both a source port and a destination IP address;
   comparing the indicated source port and the indicated destination IP address to the cached flow registration to determine a matching source port and destination IP address pairing;
   determining a destination L2 address as the respective destination L2 address associated with the matching source port and destination IP address pairing in the cached flow registration
   adding a Packet Data Convergence Protocol (PDCP) header indicating the determined destination L2 address to the unicast C-V2X IP packet;
   determining the one or more flow attributes associated with the determined destination L2 address based at least in part on the flow registration, and sending the unicast C-V2X IP packet to the determined destination L2 address according to the determined one or more flow attributes.

2. The method of claim 1, wherein the one or more flow attributes comprise a periodicity, a semi-persistent scheduling (SPS) sidelink identifier, a priority, a packet delay budget (PDB), or a transmit power.

3. The method of claim 1, wherein the unicast C-V2X IP packet is a transmission control protocol (TCP) packet or a user datagram protocol (UDP) packet.

4. The method of claim 1, wherein the determined destination L2 address is a media access control (MAC) address of another vehicle.

5. A method for unicast transmission of cellular vehicle-to-everything (C-V2X) Internet Protocol (IP) packets performed by a modem of a vehicle, comprising:
   receiving a destination address registration from a processor of the vehicle indicating one or more destination IP address and respective destination layer 2 (L2) address pairings;
   storing the one or more destination IP address and respective destination L2 address pairings in an address mapping table in a memory available to the modem of the vehicle;
   receiving a flow registration associated with the destination address registration from the processor of the vehicle, the flow registration indicating one or more flow attributes to use for all respective destination L2 addresses in the destination address registration;
   setting the one or more flow attributes as default flow attributes for the address mapping table;
   receiving a unicast C-V2X IP packet at the modem of the vehicle from the processor of the vehicle, wherein an IP header of the unicast C-V2X IP packet includes indications of both a source port and a destination IP address;
   comparing the indicated destination IP address to the address mapping table to determine a matching destination IP address; and
   determining a destination L2 address as the respective destination L2 address associated with the matching destination IP address in the address mapping table;
   adding a Packet Data Convergence Protocol (PDCP) header indicating the determined destination L2 address to the unicast C-V2X IP packet; and
   sending the unicast C-V2X IP packet to the determined destination L2 address according to the default flow attributes set for the address mapping table.

6. The method of claim 5, wherein the one or more flow attributes comprise a periodicity, a semi-persistent scheduling (SPS) sidelink identifier, a priority, a packet delay budget (PDB), or a transmit power.

7. A vehicle computing device, comprising:
   a modem configured to:
      receive a flow registration from a processor of the vehicle computing device associating one or more source port and destination IP address pairings with respective destination layer 2 (L2) addresses, the flow registration associates one or more flow attributes with each respective destination L2 address; and
      cache the flow registration in a memory available to the modem;
      receive a unicast cellular vehicle-to-everything (C-V2X) Internet Protocol (IP) packet from the processor of the vehicle computing device, wherein an IP header of the unicast C-V2X IP packet includes indications of both a source port and a destination IP address:
      compare the indicated source port and the indicated destination IP address to the cached flow registration to determine a matching source port and destination IP address pairing;
      determine a destination L2 address as the respective destination L2 address associated with the matching source port and destination IP address pairing in the cached flow registration;
      add a Packet Data Convergence Protocol (PDCP) header indicating the determined destination L2 address to the unicast C-V2X IP packet;
      determine the one or more flow attributes associated with the determined destination L2 address based at least in part on the flow registration; and
      send the unicast C-V2X IP packet to the determined destination L2 address according to the determined one or more flow attributes.

8. The vehicle computing device of claim 7, wherein the one or more flow attributes comprise a periodicity, a semi-persistent scheduling (SPS) sidelink identifier, a priority, a packet delay budget (PDB), or a transmit power.

9. The vehicle computing device of claim 7, wherein the unicast C-V2X IP packet is a transmission control protocol (TCP) packet or a user datagram protocol (UDP) packet.

10. The vehicle computing device of claim 7, wherein the determined destination L2 address is a media access control (MAC) address of another vehicle.

11. A vehicle computing device, comprising:
a modem configured to:
  receive a destination address registration from a processor of the vehicle computing device indicating one or more destination IP address and respective destination layer 2 (L2) address pairings;
  store the one or more destination IP address and respective destination L2 address pairings in an address mapping table in a memory available to the modem;
  receive a flow registration from the processor of the vehicle associated with the destination address registration, the flow registration indicating one or more flow attributes to use for all respective destination L2 addresses in the destination address registration;
  set the one or more flow attributes as default flow attributes for the address mapping table;
  receive a unicast cellular vehicle-to-everything (C-V2X) Internet Protocol (IP) packet from the processor of the vehicle computing device, wherein an IP header of the unicast C-V2X IP packet includes indications of both a source port and a destination IP address;
  determine a destination L2 address based at least in part on the indicated destination IP address;
  add a Packet Data Convergence Protocol (PDCP) header indicating the determined destination L2 address to the unicast C-V2X IP packet;
  send the unicast C-V2X IP packet to the determined destination L2 address according to the default flow attributes set for the address mapping table.

12. The vehicle computing device of claim 11, wherein the one or more flow attributes comprise a periodicity, a semi-persistent scheduling (SPS) sidelink identifier, a priority, a packet delay budget (PDB), or a transmit power.

* * * * *